United States Patent
Roder et al.

Patent Number: 6,009,326
Date of Patent: Dec. 28, 1999

[54] ANCHOR RADIO SYSTEM BASED HANDOVER

[75] Inventors: Paul William Roder, Tinton Falls; Mehmet Ulema, Middletown, both of N.J.

[73] Assignee: Telecordia Technologies, Inc., Morristown, N.J.

[21] Appl. No.: 08/557,921

[22] Filed: Nov. 14, 1995

[51] Int. Cl.$^6$ ........................................ H04Q 7/24
[52] U.S. Cl. ........................................ 455/436; 455/445
[58] Field of Search ........................ 455/432, 433, 455/436, 437, 438, 439, 440, 441, 442, 443, 444, 445, 560, 561

[56] References Cited

U.S. PATENT DOCUMENTS

| | | | |
|---|---|---|---|
| 4,833,701 | 5/1989 | Comroe | 455/432 |
| 5,018,187 | 5/1991 | Marinho | 455/445 |
| 5,291,544 | 3/1994 | Hecker | 455/436 |
| 5,590,172 | 12/1996 | Lodwig et al. | 455/436 |
| 5,646,978 | 7/1997 | Klem et al. | 455/436 |
| 5,666,653 | 9/1997 | Ahl | 455/443 |
| 5,761,623 | 6/1998 | Lupien et al. | 455/450 |

OTHER PUBLICATIONS

*ISDN Channel Exchange Access Signaling & Switching Requirements (Layer 2)*, Bellcore TR–TSY–000793, Issue 1, Oct. 1988.

*ISDN User–Network Interface—Data Link Layer Specification*, Recommendation Q.921, CCITT Blue Book 1988.

*Circuit Switched Digital Capability Network Access Interface Specifications—Switched Network Compatibility & Performance Specifications for 2–Wire Connection to the Digital Public Switched Network*, Bellcore TR–880–22135–84–01, Issue 1, Jul. 1984.

Primary Examiner—Dwayne D. Bost
Assistant Examiner—Myron K. Wyche
Attorney, Agent, or Firm—Joseph Giordano

[57] ABSTRACT

An anchor RS acts as the single interface between the switched telephone network and the wireless communications system throughout an entire call, even if the subscriber unit travels to different radio systems during the call. This allows (1) the signaling to set up the connections between the anchor and target RPCUs; and (2) the maintenance information for the call to remain in the anchor RPCU, which is connected to the original switch. This avoids tying up network switches with exchanging signals and call maintenance information about service features, thus resulting in a substantial "savings" in valuable telephone network resources. Also, existing switches do not need to be replaced or reconfigured to accommodate this hand over method.

8 Claims, 19 Drawing Sheets

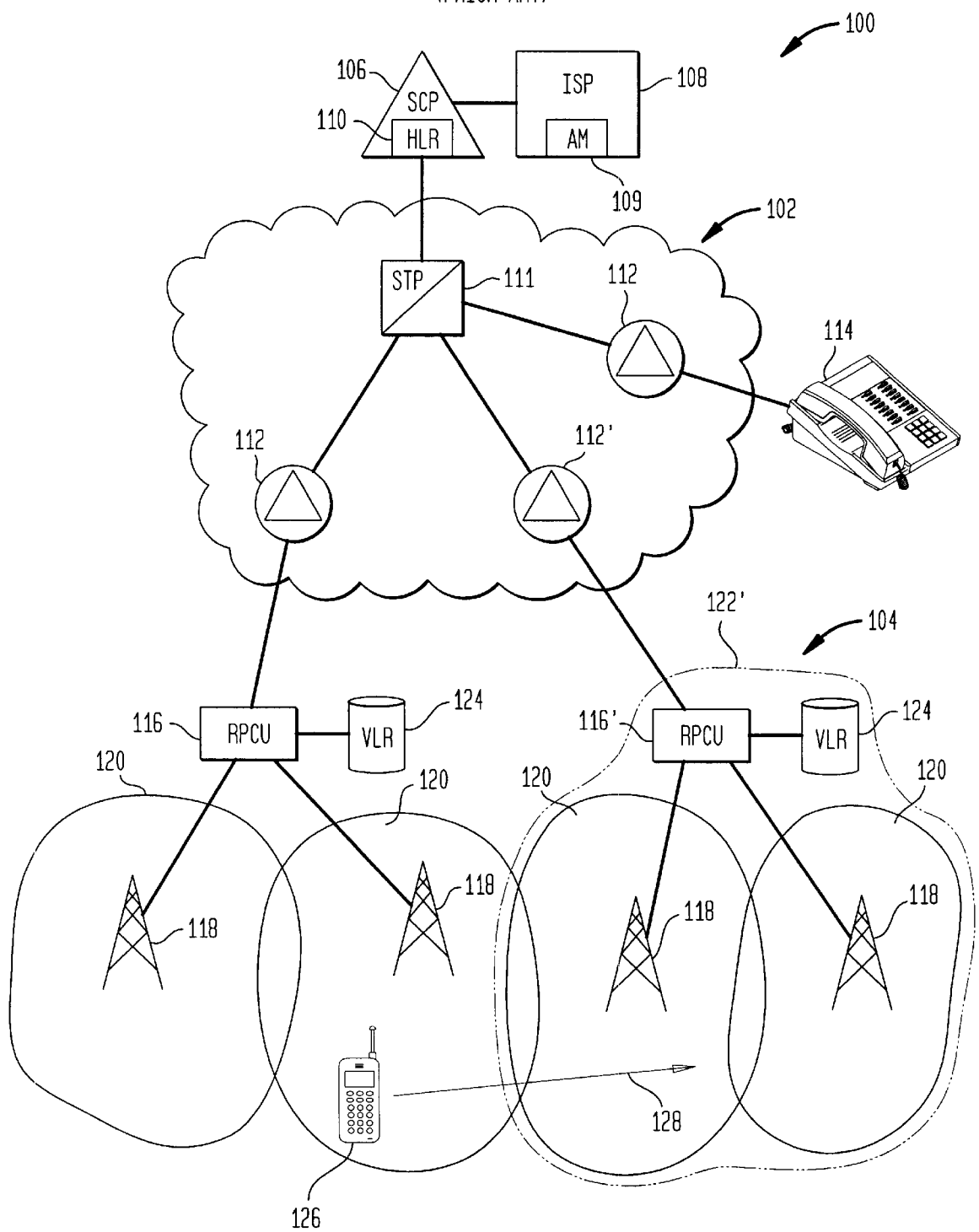

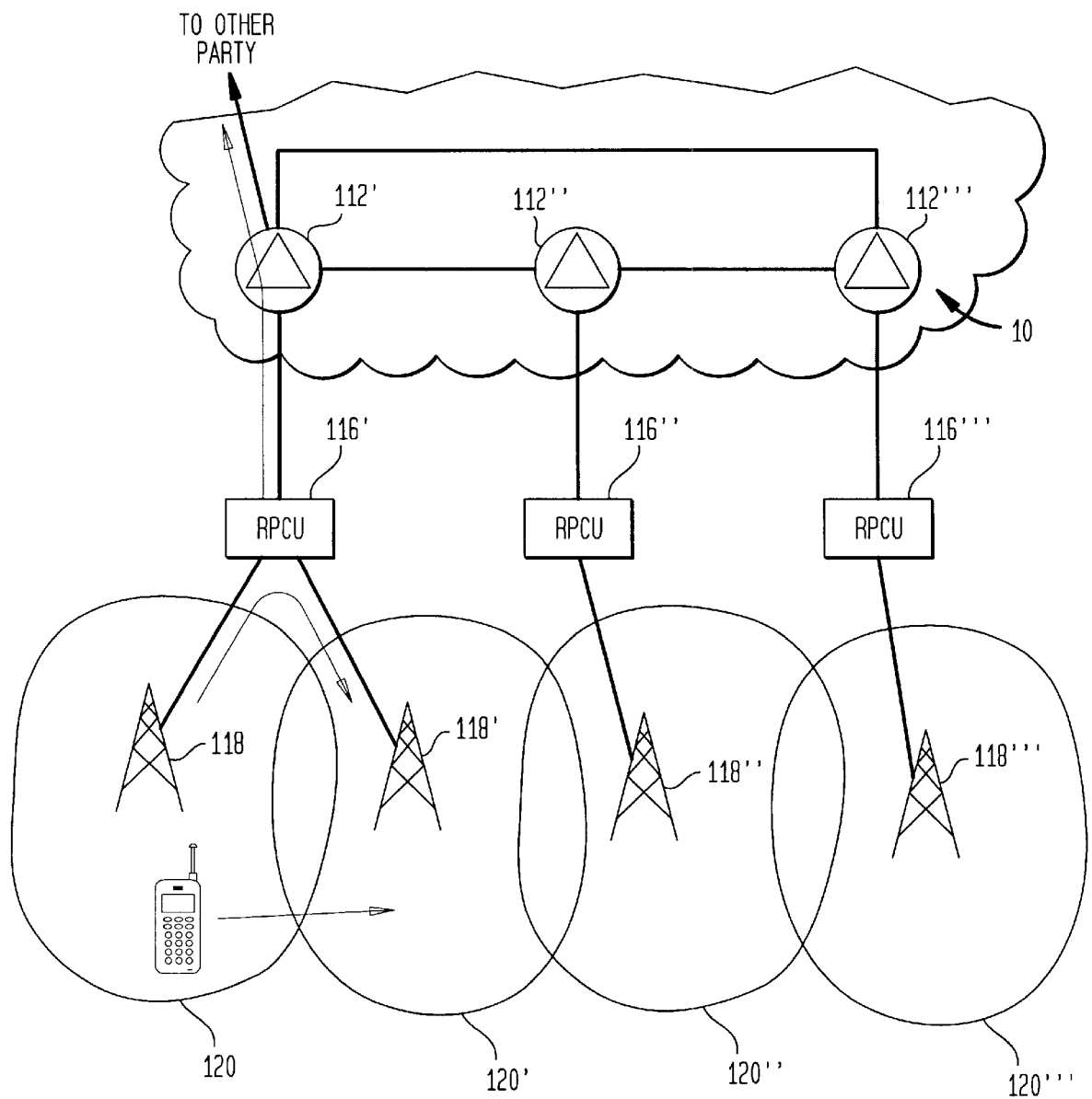

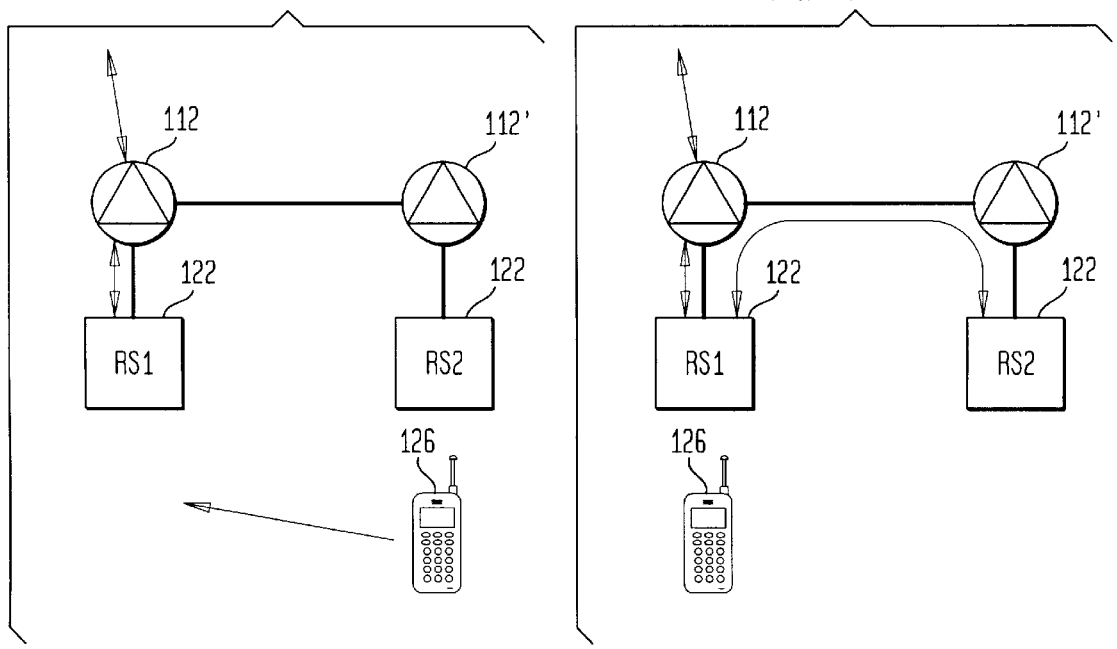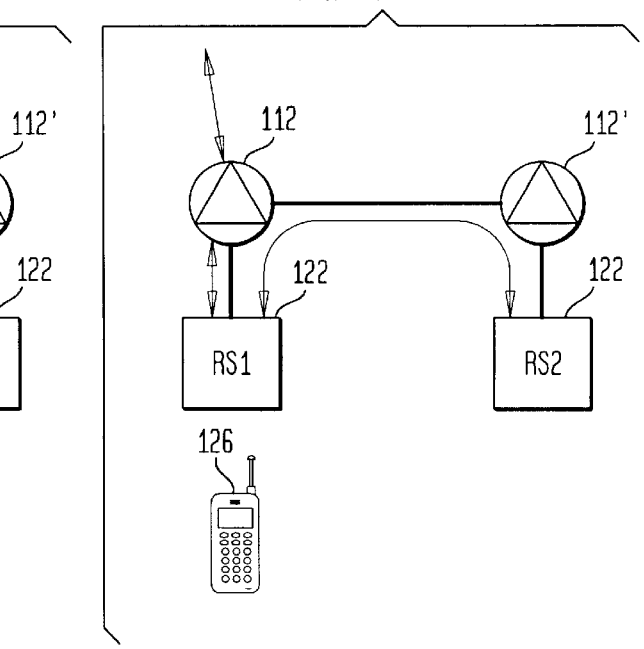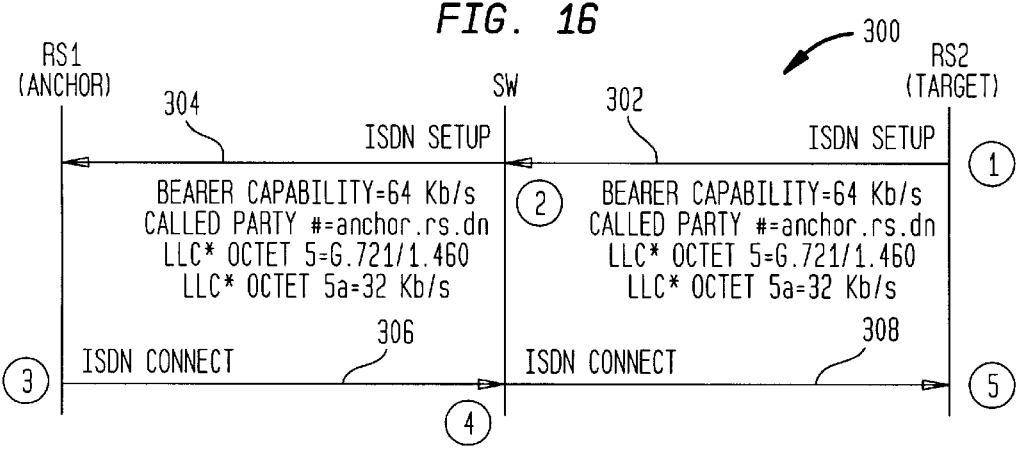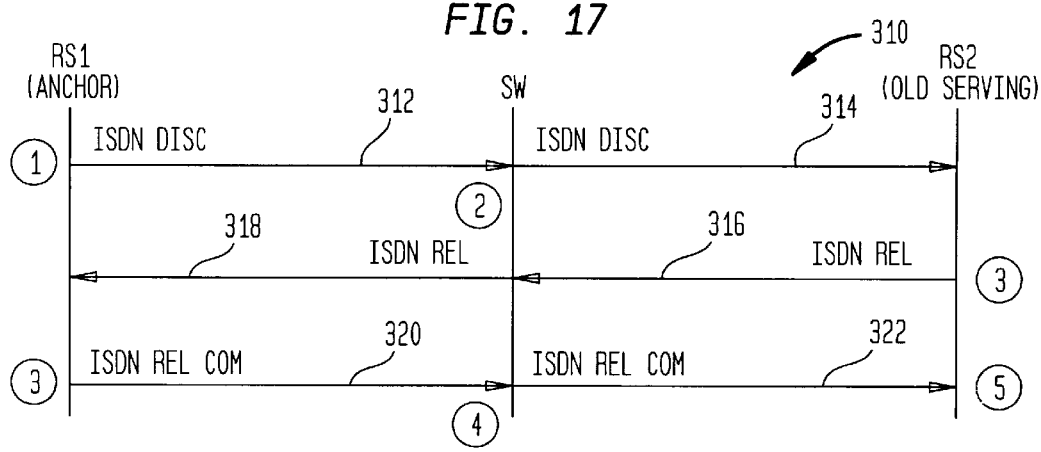

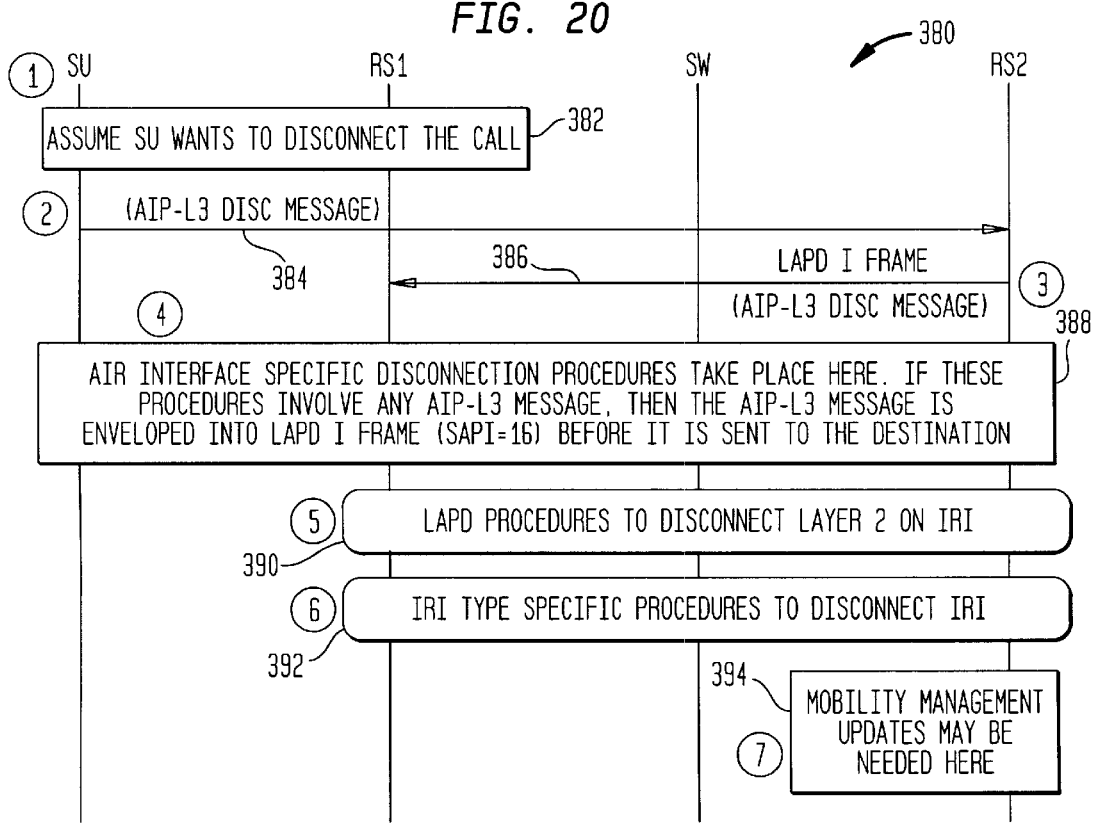
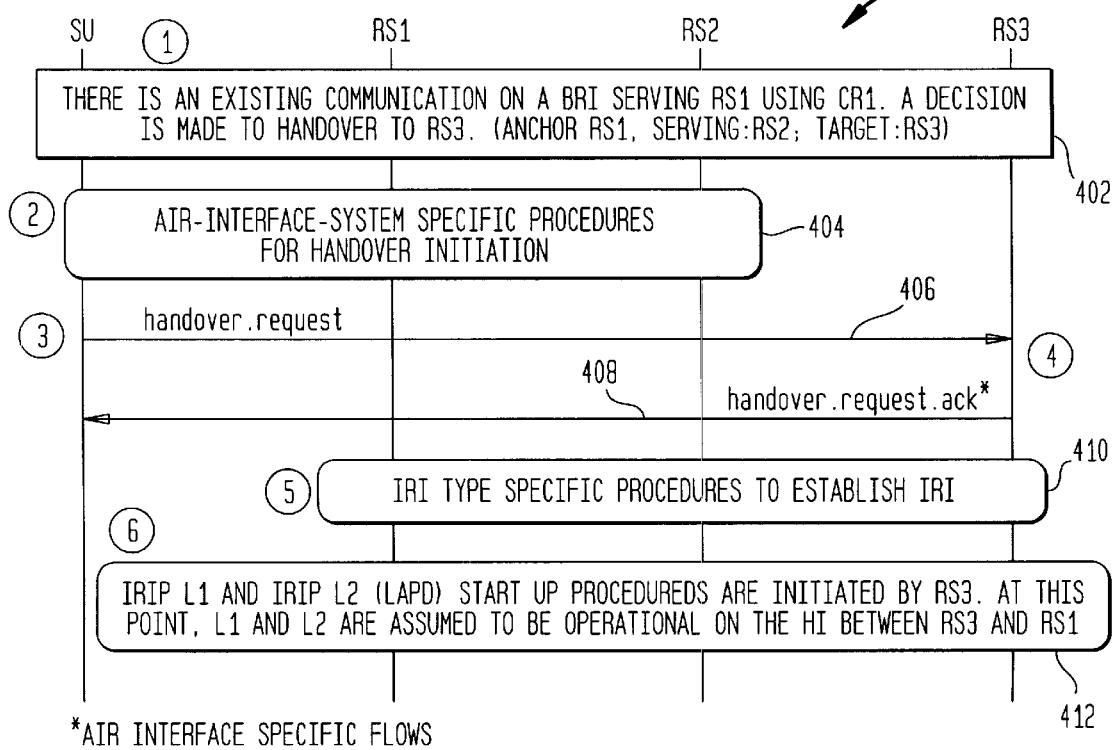

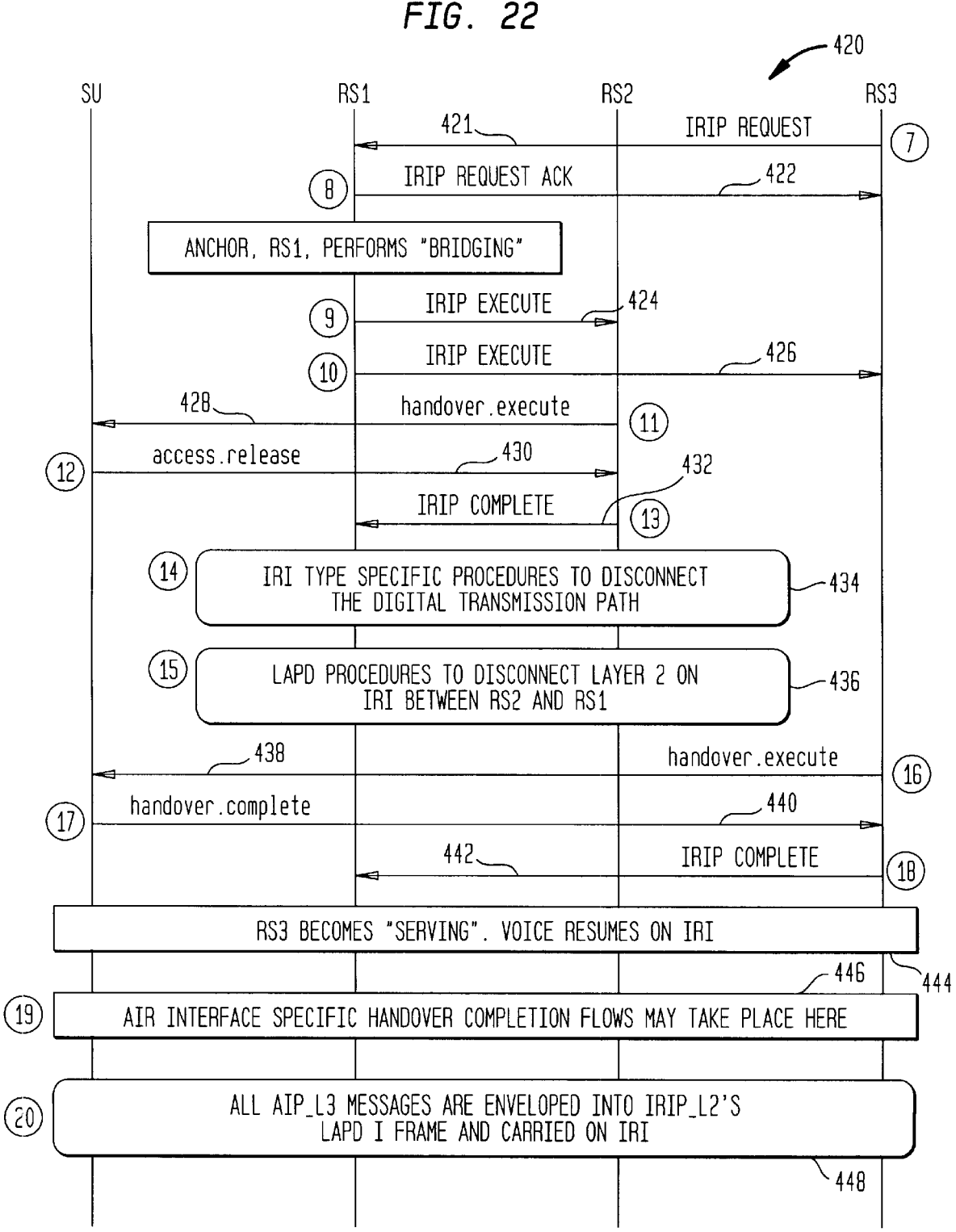

6,009,326

ANCHOR RADIO SYSTEM BASED HANDOVER

FIELD OF THE INVENTION

The present invention is directed to wireless communications systems and, more particularly, to an improved system and method for handing over mobile wireless communications.

BACKGROUND OF THE INVENTION

Wireless communications systems, such as Personal Access Communications Systems (PACS), require mobile communications made or received by a mobile user to be routed to the mobile user's terminal (the subscriber unit or mobile terminal) with little or no interruption in the call, even as the mobile user travels through one or more wireless communications coverage areas (CAs).

FIG. 1A illustrates a typical PACS 100. The PACS includes a switched telephone network 102, such as a public switched telephone network (PSTN) or an Integrated Signaling Digital Network (ISDN), connected to a wireless communications system 104. Also connected to the switched telephone network are a network database 106 and a network server 108. The network database 106 may be a Bellcore proprietary Advanced Intelligent Network service control point (SCP). The database 106 includes a Home Location Register (HLR) 110. The HLR 110 contains a database maintained by a user's local telephone company at the user's home location and includes information about the user called the user profile. The database 106 is connected to a network server or intelligent peripheral 108, such as a Bellcore Proprietary Intelligent Services Peripheral (ISP). The network server may include an access manager (AM) 109 which contains information about servicing the user's incoming and outgoing communications. The database 106 and server 108 preferably communicate using the 1129+ protocol, but any suitable communication protocol may be used.

The database 106 is connected to a Switching Transfer Point (STP) 111 in the switched telephone network 102. The STP 111 may be connected to a number of Service Switching Points (SSP) 112. The SSPs 112 connect to customer premises to provide for premises equipment, such as a wireline telephone 114. An SSP 112 may also be connected to one or more Radio Port Control Units (RPCU) 116, which are part of the wireless communications system 104. The RPCU 116 is connected to a number of Radio Ports (RP) (or Base Stations (BS)) 118, which monitor a "cell" (or "coverage area") 120. The RP (or BS) 118 and connected RPCU 116 are referred to herein collectively as a "radio system" (RS) 122. One RS 122 is shown in FIG. 1A in dashed lines. One or more RPCU 116 are connected to a second database called the Visiting Location Register (VLR) 124. The VLR 124 is maintained by a local telephone company at the location the mobile user and subscriber unit (or mobile terminal) 126 are visiting. The VLR 124 stores a subset of the HLR user information, and records that the subscriber unit (SU) 126 is currently located in that VLR. The HLR 110 keeps a record of the VLR in which the mobile terminal is currently registered. One VLR 124 may cover a number of RSs 122.

As seen in FIG. 1A, where a subscriber unit 126 initiates or receives a communication, it communicates with an RP (or BS) 118 using an air interface protocol. The RP 118 is connected to a RPCU 116 which communicates with an SSP 112 using an RS/switch protocol. The communication path between the SU 126 and another party on a wireline telephone 114 is shown with the thick arrow.

As seen in FIG. 1B, when the SU 126 travels to a new RS 122 (e.g., changes to RPCU 116'), as shown by arrow 128, communication is directed to the new RS 122'. The old RS hands over the call to the new RS and the registration information is updated in order for communications to be directed to the SU at its new location.

The switch 112 transfers the SU registration information and provides it to the new RPCU 116'. The location of the new RS is stored in the VLR 124. If the SU 126 travels to an RS 122 covered by another VLR 124, the switch 112 transfers the subset of the HLR data stored in the previous VLR to the new VLR. The location of the new VLR is stored in the HLR and the previous VLR location is deleted from the HLR 110. The updated registration and SU status information may also be stored in the AM 109.

In many known wireless communications system, such as the European GSM system and cellular telephone networks, when an SU moves from a first RS 122 to a second RS (such as illustrated by the arrow in FIG. 1B) during a call, the switch 112 performs the handover to the new RS. That is, the switch 112 handles the signaling used to make and break communications between the SU 126, the old and new RPs 118, and the switched telephone network 102.

If the handover is between RSs, the switch 112 handles the signaling used to switch the communications and information between old and new RPCUs 116. As seen in FIG. 1C, the call and all information related to it are transferred to switch 112' connected to the new RS. The new RS communicates with the SU using the air interface protocol and communicates with the switched telephone network using the RS/switch protocol. The communication path is shown with the thick arrow. This handover is undesirable because the switch is part of the switched telephone network 102 and has limited resources to process handovers. Handovers used a great deal of processing, particularly if the handover is between RSs. Thus, it is "expensive" (in terms of switch resources and bandwidth) to use the switch to perform the handover. Also, call maintenance information about service features—three way calling, call waiting, etc.—are maintained at the switch 112. This information is sent to the switch connected to the new RPCU. This, too, is an "expensive" use of network resources. Moreover, sending call maintenance information between switches incurs costly modifications to the software of the existing switches.

Therefore, it is an object of the present invention to provide a method for removing the handover control from the telephone network switch.

It is another object of the present invention to provide a method for keeping call maintenance information about service features in a single location during a wireless communication.

It is yet another object of the present invention to provide a method for maintaining a single interface between the wireless communication network and the switched telephone network during a call, even if the subscriber unit travels to different coverage areas during the call.

It is yet another object of the present invention to minimize the modification of the existing switches to accommodate the handovers.

SUMMARY OF THE INVENTION

These and other objects are achieved by the present invention. The present invention provides for an anchor RS which acts as the single interface between the switched telephone network and the wireless communications system throughout an entire call, even if the subscriber unit travels to different radio systems during the call.

When a communication is established between a switched telephone network and a wireless subscriber unit, the RS in which the subscriber unit is located performs the air interface protocol between the RP and SU and the RS/switch protocol between the RPCU and the switch. If the SU travels to a new RS during the call, the RS in which the communication was established—called the anchor RS—continues to be the interface between the wireless communication network and the telephone network. A new RS—called the serving RS—handles the air interface protocol between the SU and the wireless communication network. In order for the communication to reach the telephone network, a new interface is created between the anchor RS and the serving RS. This interface is called the inter-radio system interface or IRI. The IRI runs a new protocol called the IRI protocol or IRIP. If the SU enters a third RS during the communication, the anchor RS establishes an IRI between it and the third RS and disconnects the IRI between it and the second RS. This allows a single RS to be the interface between the wireless communication network and the telephone network, thus eliminating the need for switches to handover calls to other switches, and the need to modify existing switches to accommodate the handover.

BRIEF DESCRIPTION OF THE DRAWINGS

The present invention is described with reference to the following figures:

FIGS. 1A, 1B, and 1C illustrate a prior art Personal Access Communication System and handover method;

FIG. 2 illustrates an intra-RS handover in a wireless communication system;

FIGS. 15A and 15B illustrate a handover-back-to-anchor scenario;

FIG. 16 illustrates an exemplary call flow for establishing an IRI interface for an on-demand transmission path;

FIG. 17 illustrates an exemplary call flow for tearing down an IRI on-demand transmission path;

FIG. 20 illustrates an exemplary disconnection call flow for a generic handover-forward scenario;

FIG. 21 illustrates an exemplary handover initiation call flow for a generic handover-to-third scenario;

FIG. 22 illustrates an exemplary handover execution and completion call flow for a generic handover-to-third scenario;

DETAILED DESCRIPTION OF A PREFERRED EMBODIMENT

For clarity of presentation, the detailed description is set out in the following subsections:

I. Overview of the Invention

Figure 3:
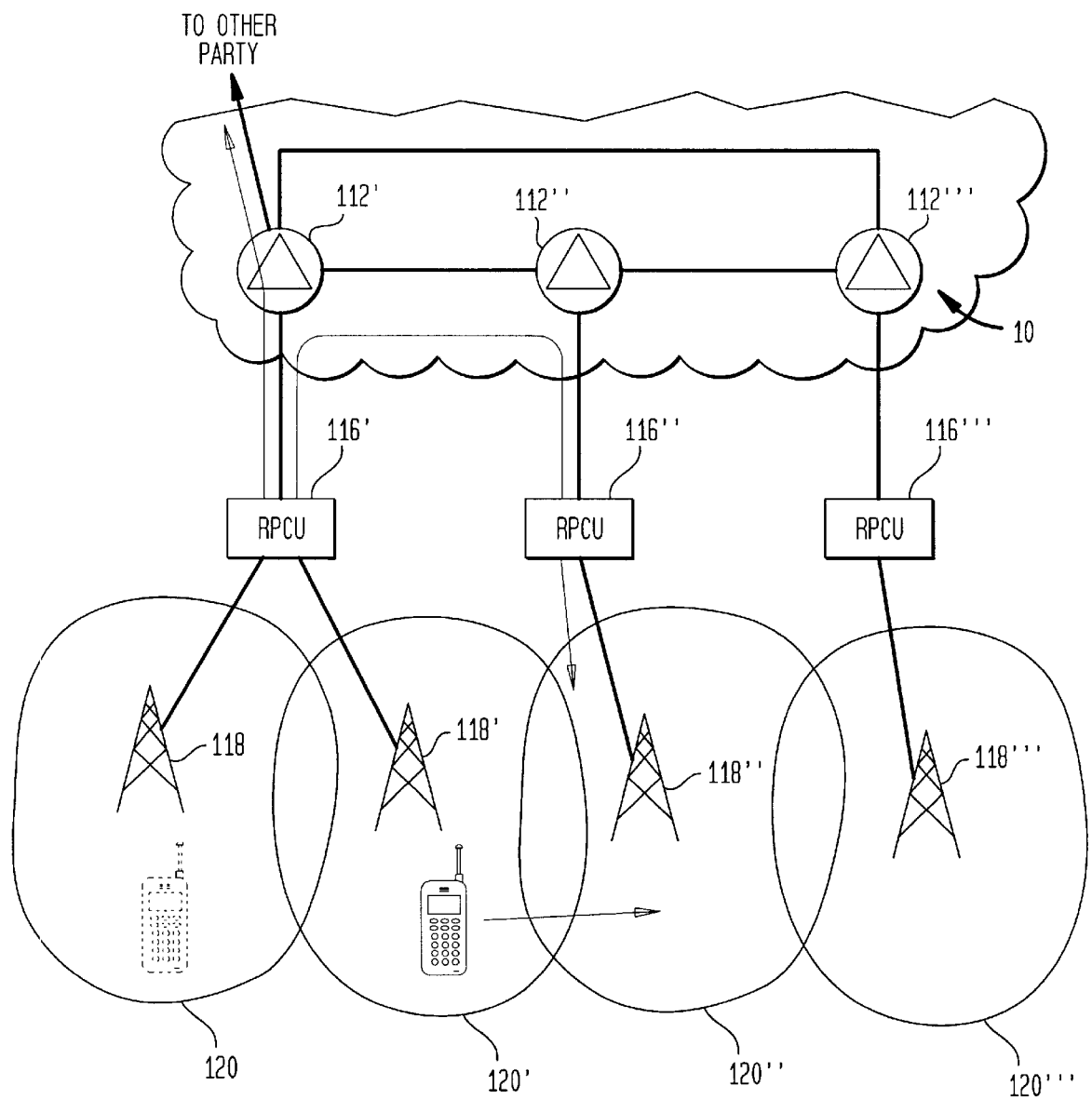
FIG. 3 illustrates a first inter-RS handover in a wireless communication system.
Figure 4:
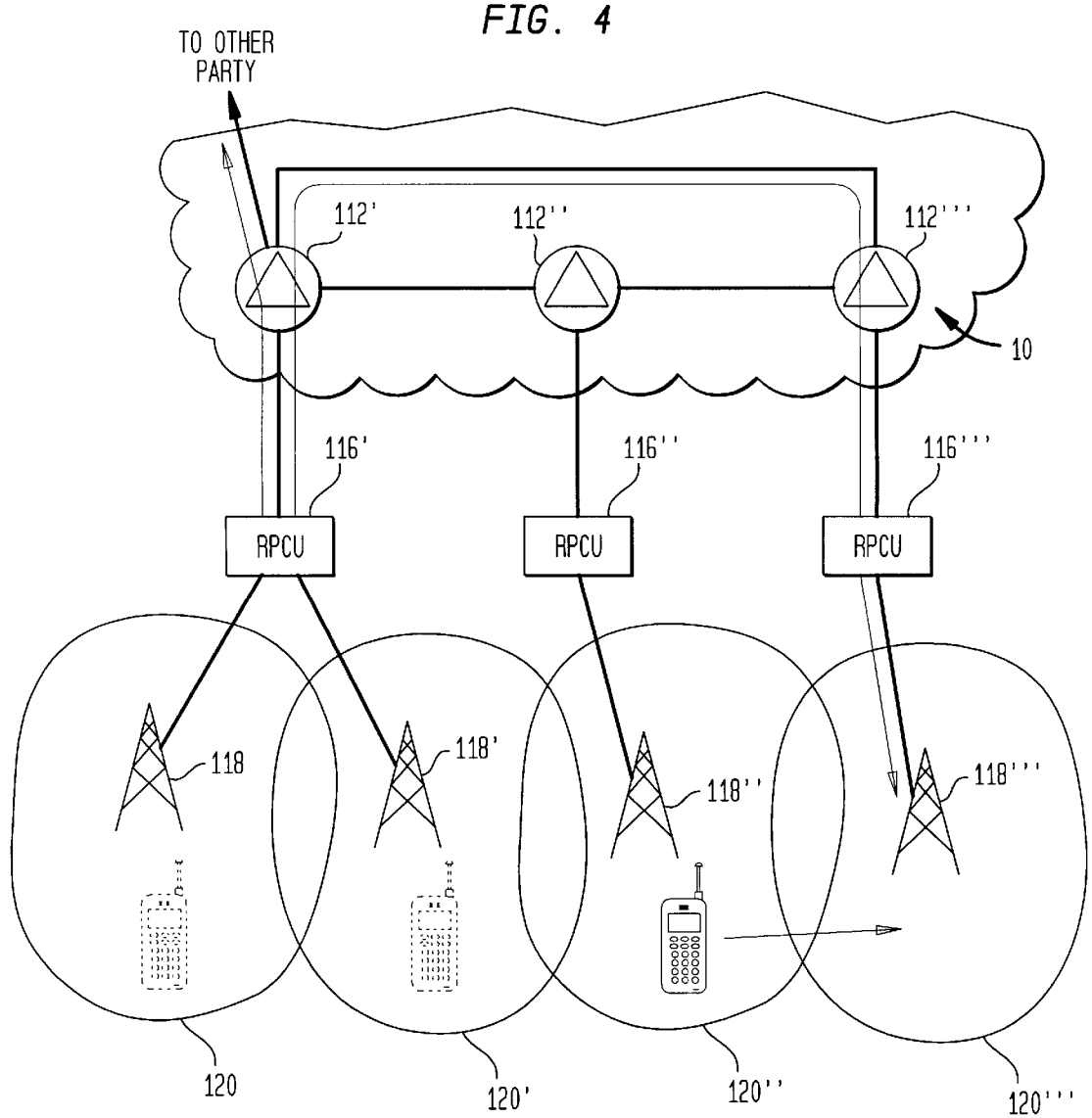
FIG. 4 illustrates a second inter-RS handover in a wireless communication system.

An overview of the invention is provided with reference to FIGS. 2–4.

II. The Inter-Radio System Interface (IRI)

The interface between RSs established during a call is described with reference to FIGS. 5–8. The section discusses IRI transmission path alternatives, IRI subchannels, and IRI protocol architecture.

III. Functional Entities

The "Functional Entities" are additional functions used in performing the RS-to-RS handover. The functional entities are the handover mangers and mapping entities of the IRI protocol architecture shown in FIG. 8.

IV. The Inter-Radio System Protocol (IRIP) Layer 1

The IRIP layer 1 is described with reference to FIGS. 9A–9B. This first layer is responsible for the physical transmission of bits between RSs.

V. The Inter-Radio System Protocol (IRIP) Layer 2

The IRIP layer 2 is described. The second IRIP layer links the first and third IRIP layers. IRIP-L2 performs data framing, error checking, and transmissions functions.

VI. The Inter-Radio System Protocol (IRIP) Layer 3

The IRIP Layer 3 is described with reference to FIGS. 10–11. IRIP-L3 provides mechanisms for exchanging various signals between RSs to perform the handover.

The IRIP-L3 functions, message set, and parameters are discussed.

VII. Generic Call Flows

The invention is described by illustrating generic call flows shown in FIGS. 12–24. This section provides call flows for the anchor RS-based handover procedure assuming a generic air interface protocol and a generic RS/switch protocol. Discussed are different scenarios and conventions; IRI transmission path establishment and disconnection call flows; handover-forward call flows; handover-to-third call flows; and handover-back-to-anchor call flows.

VIII. PACS Call Flows

A preferred embodiment of the invention is described by illustrating call flows using the PACS protocol as shown in FIGS. 25–31. In order to illustrate the present invention, it may be used with a known air interface protocol. Call flows for the handover-forward, handover-to-third and handover-back-to-anchor scenarios using the PACS air interface protocol are provided. Discussed are PACS messages and parameters; handover-forward call flows; handover-to-third call flows; and handover-back-to-anchor scenario call flows.

IX. Conclusion

A glossary of acronyms used is attached as Appendix A.

I. Overview of the Invention

Where a call was originally established with a wireless subscriber unit (SU), the radio system (RS) in which the SU is located performs the air interface protocol between the SU and radio port (RP), and performs the RS/switch protocol between the radio port control unit (RPCU) and the telephone network. If the SU travels to a new RS during the call, the original RS—called the anchor RS—continues to be the interface between the wireless communication network and the telephone network. The new RS—called the serving RS—becomes the interface between the wireless communication network and the SU. The anchor RS acts as the single interface between the switched telephone network and the wireless communications system throughout an entire call, even if the subscriber unit travels to other RSs during the call.

In order for the wireless communication system to have a single interface with the telephone network for the duration of the call, a new inter-RS interface is provided. This interface—called the inter-radio system interface (IRI)—is established between the anchor RS and the serving RS using an IRI protocol or IRIP. When the SU is entering into a new RS coverage area, this new RS becomes the target RS and a handover connecting the anchor RS to the target RS is performed.

Figure 1A:
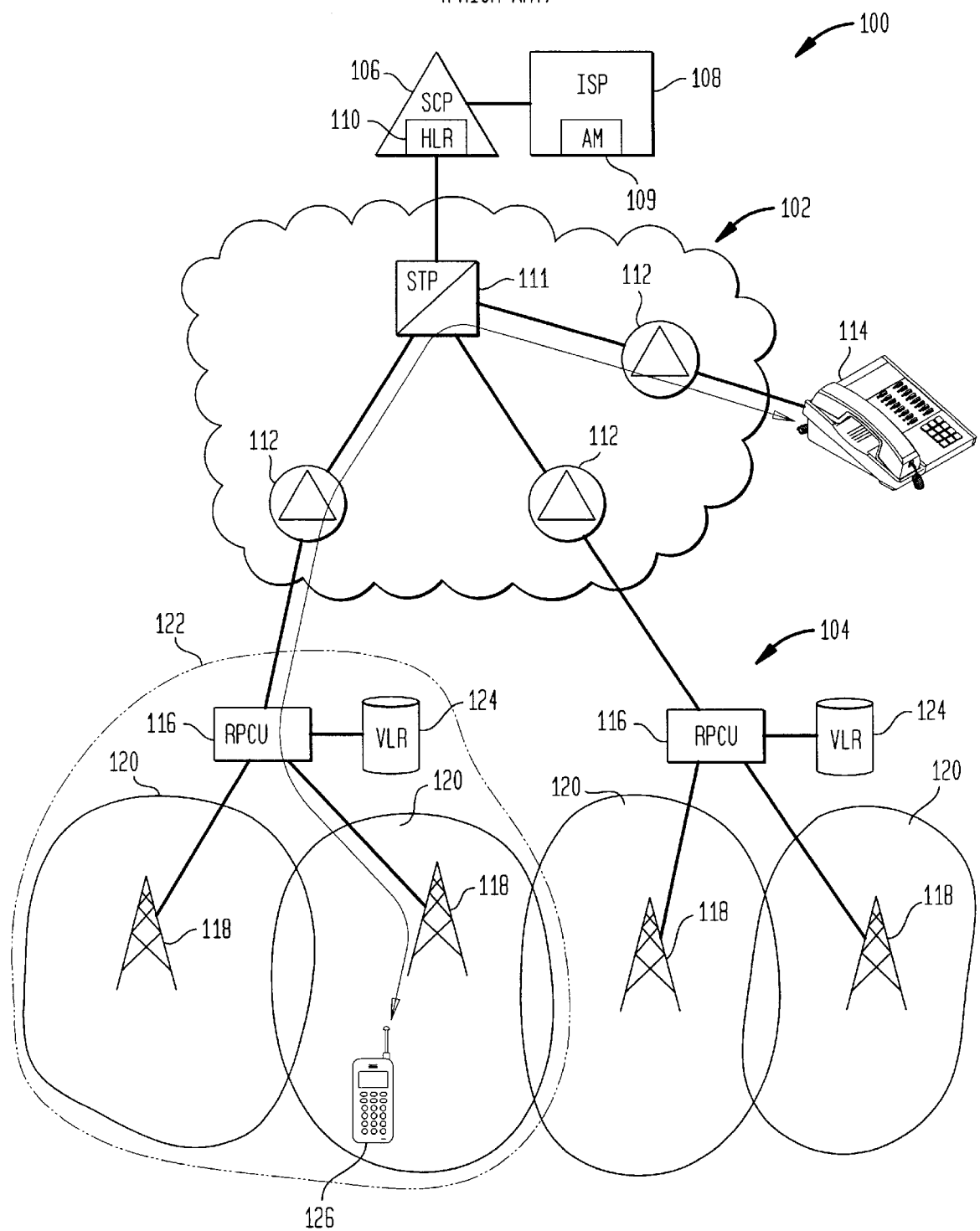
Figure 1C:
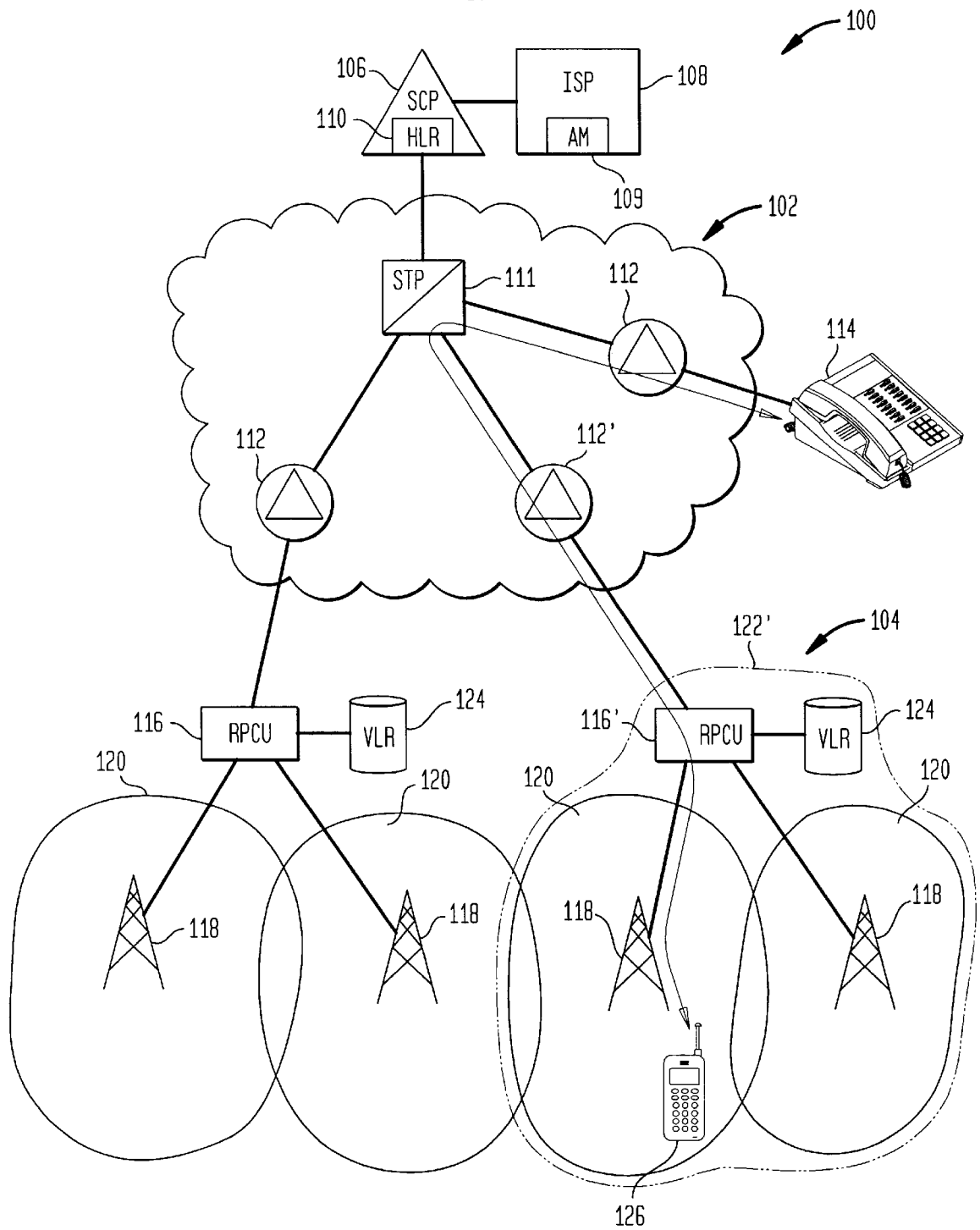

FIG. 2 illustrates a portion of the PACS 100 of FIG. 1. A SU 126 initiates (or receives) a call while located in a first coverage area (CA) 120. The call is connected to a called (or calling) party through a telephone network 102. During the call, the SU 126 moves from a first CA 120 to a second CA 120'. The first and second CAs are covered by RPs 118, 118' which are connected to the same RPCU 116'. This is an intra-RS handover, and neither the call nor information about handling the call is transferred to another RS.

During the same call, the SU 126 moves from the second CA 120' to a third CA 120" as illustrated in FIG. 3. The second and third CAs are covered by RPs 118', 118" which are connected to different RPCUs 116', 116". This is an inter-RS handover.

Information about making and breaking connections from the current RP and RCPU (the "serving RS") to the new RP and RCPU (the "target RS") are exchanged between RSs; and the call and information about the SU are transferred to the target RPCU. This is called an inter-RS handover. The first RS, where the call was initiated, is the "anchor RS" (note that when the SU is in the RS where the call originated, the anchor RS and serving RS are the same).

The target RS signals the anchor RS (which in this case is also the serving RS) that a handover is requested and establishes a connection—the IRI—between the RSs. The two major functions of the IRI are (1) to carry user information, e.g., the call, from the serving RS to the anchor RS (and visa versa) and (2) to allow the RSs to exchange signaling messages about making and breaking connections. When the handover is complete, the second RS is the serving RS.

During the same call, the SU 126 moves from the third CA 120" to a fourth CA 120'" as illustrated in FIG. 4. The third and fourth CAs are covered by RPs 118", 118'" which are connected to different RPCUs 116', 116'". This is an inter-RS handover. Information about making and breaking connections from the "serving RS" (the second RS) to the "target RS" (the third RS) is exchanged between RSs; and information about the SU and the call is transferred to the target RPCU. The first RS, where the call was initiated, remains the "anchor RS" throughout the call.

The target RS signals the anchor RS that a handover is requested and establishes the IRI between the target and anchor RSs. When the handover is complete, the second RS is dropped from the connection and the third RS becomes the serving RS.

Note that throughout the call, the anchor RS remains the interface with the telephone network through which the call was connected to the other party. This allows both (1) the signaling for setting up the connections between the anchor and target RPCUs and (2) the maintenance information for the call, to remain in the anchor RPCU 116' connected to the original switch 112'. The service features are controlled by the switch and invoked by the RPCU. This avoids tying up network switches with exchanging signals and call maintenance information about service features, thus resulting in a substantial "savings" in valuable telephone network resources. This also eliminates any need to modify the existing switches to accommodate the handover.

II. The Inter-Radio System Interface

The anchor RS remains the switched telephone network access point for the communication throughout the call. As the SU 126 moves from a serving RS towards a target RS, connections between these RSs are established. The RSs are interconnected through the telephone network 102 so that there are no intermediate switches between the anchor RS and serving RS. When a connection is established between the anchor RS and the target RS, the connection between the anchor RS and the previous serving RS is dropped.

In order for the anchor RS to remain the interface between the wireless communications network and the telephone network, even when the SU travels to different RS coverage areas, an interface is established connecting the anchor RS with the RS serving the SU. This interface is the inter-RS interface or IRI. The IRI is the interface between the anchor RS and the serving RS during a call. This section discusses IRI transmission path alternatives, IRI subchannels, the interface architecture, and the interface layers.

A. IRI Transmission Path Alternatives

Figure 5:
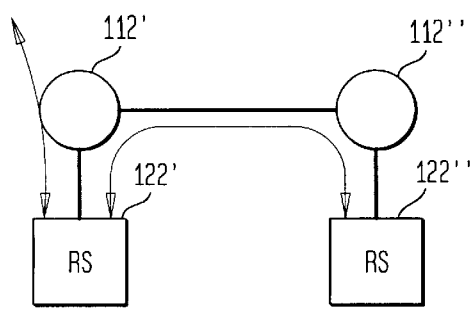
FIG. 5 illustrates a switch loopback connection IRI transmission path.
Figure 6:
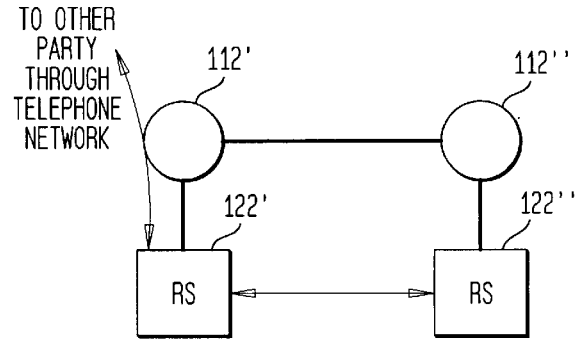
FIG. 6 illustrates a direct connection IRI transmission path.

In order to handover a call from one RS to another, at least two things are transferred between the anchor RS and target RS: the user information (e.g., the call); and signaling messages. These signaling messages control the connection and disconnection of the interface and the handover. Both are preferably handled through the same transmission path between the RSs. Two preferred schemes are discussed. The first is called the switch loopback connection and is illustrated in FIG. 5. The second is called the direct connection and is illustrated in FIG. 6.

Both types of transmission paths use similar in-channel call flows during inter-RS handover. These call flows are discussed below in Section VII, B1. When the handover is completed, a single connection exists between the anchor RS and the target RS.

The control of call maintenance functions for service features, such as three-way calling and call-waiting, remain at the anchor RS for the duration of the call because it remains the interface to the switch controlling these functions. Thus, the serving RS transfers user initiated service feature requests (i.e., requesting a three way call, or answering a call waiting call) back to the anchor RS, and the anchor RS invokes the feature from the switch. In a preferred embodiment, neither the loopback nor the direct connection circuits handle the service requests. The target RS sends a message to the anchor RS, and the anchor RS invokes the service feature from the switch 112 to which it is connected.

1. Switch Loopback Connection

The switch loopback connection is illustrated in FIG. 5. A data signal path is established through switches between an anchor RS 122' and a target RS 122". A switch loopback connection may be implemented in one of two ways. A first way is a circuit switched connection called an "on-demand" connection. A second way is a permanent connection called a "nailed-up" connection.

a. On-Demand Switch Loopback

An on-demand switch loopback connection preferably uses a circuit-switched data connection between RSs through one or more switches to establish an interface between the anchor RS 122' and the target RS 122". This may be done using, for example, a Basic Rate Interface (BRI) or Primary Rate Interface (PRI) B channel conforming to National ISDN-1 (NI-1) specifications; or using Digital Signal Zero (DS0) based digital transmission facilities.

b. Nailed-Up Switch Loopback Connection

A nailed-up connection uses data connections between RSs that do not use external (e.g., the telephone network) connection setup procedures. This may be done using, for example, B channels permanently established between RSs. The call flows for the handover are the same as in the on-demand connection, except that no connection setup messaging is needed. These call flows are discussed below. The RSs should be able to select an available channel between the anchor RS and target RS to manage the handover signals, and then relinquish the channel when the handover is complete.

To provide complete service mobility, it is preferable for all RSs to have a "nailed-up" connection with all other RSs. It is also preferable for each pair of RSs to have a number of channels available to support peak handover traffic between the two RSs.

2. Direct Connection

A direct connection is illustrated in FIG. 6. A direct connection is established between RSs that does not go through the switches 112', 112". Preferably, the direct connection is established using digital transmission facilities, such as leased lines.

To provide complete service mobility, it is preferable for all RSs to have a "nailed-up" connection with all other RSs. It is also preferable for each pair of RSs to have a number of channels available to support peak handover traffic between the two RSs. For example, the number of 64 kilobit/second or 56 kilobit/second channels established between a pair of RSs should be chosen to handle peak handover traffic between the pair.

B. IRI Subchannels

For a handover to occur, (1) the user information (i.e., voice) should be transferred from the serving RS to the target RS; and (2) signaling data messages should be exchanged between the anchor RS and the target RS. This may be done in a number of ways. One way to accomplish this is to use the same transmission path between two RSs to carry both the user information and signaling messages in its subchannels. Another way to accomplish this is using separate transmission paths: one for RS-to-RS signaling between two RSs and the other for transferring user information (i.e., voice). Regardless of whether one or two transmission paths are used, the architecture and call flows are substantially the same. The case where the same transmission path is used is described.

Figure 7:
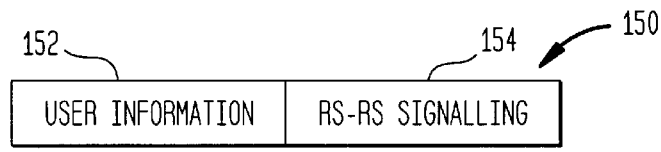
FIG. 7 illustrates a transmission path channel divided into a user information subchannel and a signaling subchannel.

FIG. 7 illustrates a transmission path channel 150 divided into a user information (i.e., voice) subchannel 152 and a signaling subchannel 154. The user information subchannel 152 transports the user information (i.e., the voice) between the anchor RS and the serving RS. The serving RS relays information about the user information subchannel from the SU to the anchor RS without processing. The anchor RS may handle any speech coding conversions which may be needed between the RPCU 116 and the switched telephone network 102. Preferably, the transmission path channel 150 is either a 64 kilobit/second channel such as a BRI or PRI B channel; or a 56 kilobit/second channel, such as a "switched 56" interface. The user information subchannel bandwidth may vary according to the speech coding used, but is preferably less than or equal to 32 kilobit/second.

The signaling subchannel 154 transports signaling information between the anchor RS, the serving RS, and the target RS. The signaling subchannel bandwidth may vary according to the type of transmission path used, but is preferably 32 kilobit/second when a 64 kb/s channel is used, and 24 kb/s when a 56 kb/s channel is used (e.g., the user information subchannel 152 uses 32 kb/s of channel bandwidth).

C. IRI Protocol Architecture

Figure 8:
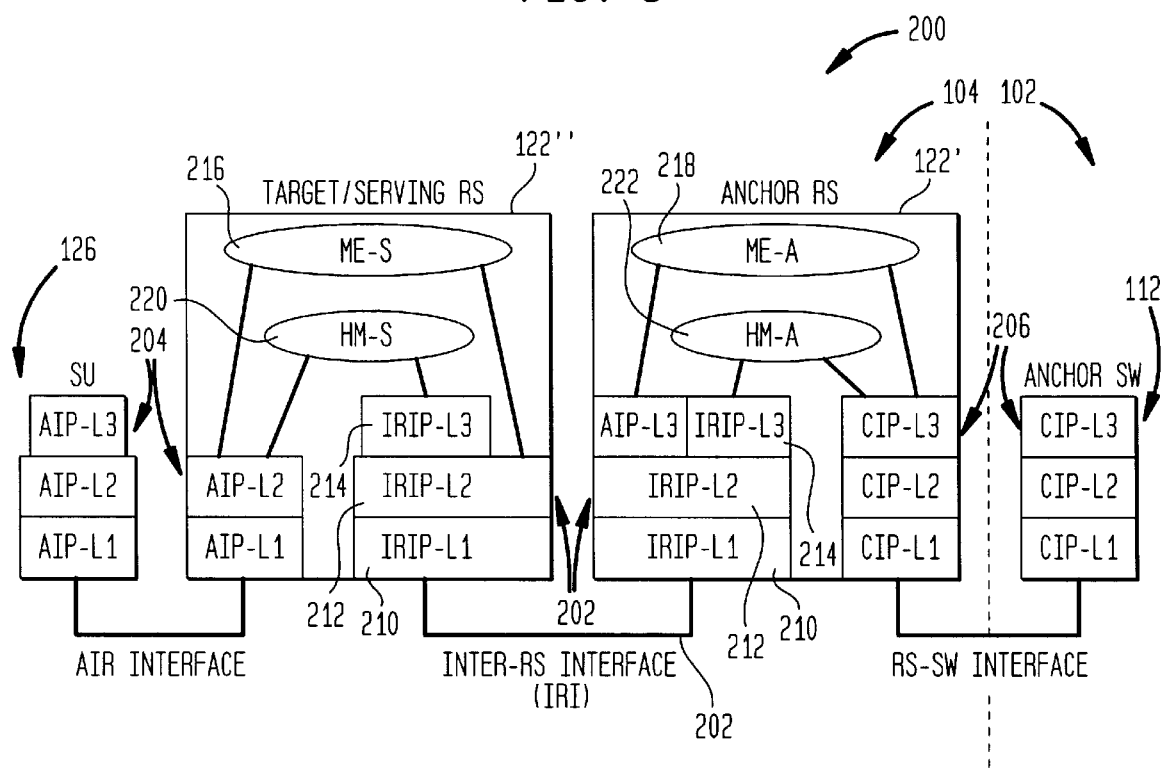
FIG. 8 illustrates a preferred protocol architecture between SU, RS, and a switch according to the present invention.

FIG. 8 illustrates a preferred protocol architecture 200 between a SU 126, a serving RS 122", an anchor RS 122', and a switch 112. The IRI protocol (IRIP) architecture 202 connects the RSs.

This discussion refers to a generic three layer air interface protocol (AIP) 204 and a generic RS/Switch protocol 206 called a C Interface Protocol (CIP). The CIP may include call control and mobility management procedures. The term "layer" as used herein refers to a function of a given protocol. A person skilled in the art readily understands that the invention may be used with many air interfaces and RS/switch protocols. The layers and protocols are generically described in detail below.

The interface between the RSs is the IRI 202, which runs the IRI protocol (IRIP). As seen in FIG. 8, the IRIP resides between a second air interface layer (AIP-L2) in the serving RS and a third air interface layer (AIP-L3) in the anchor RS. If the serving RS directly interfaced with the switch 112, the AIP-L3 would communicate with a third layer of the CIP (CIP-L3). Here, however, the serving RS does not interface with the switch.

Therefore, the AIP-L3 resides in the anchor RS so that it may communicate with the telephone network via the CIP. The IRI connects RSs between the second and third AIP layers.

The IRIP preferably has three layers. A first layer (IRIP-L1) 210 is responsible for the physical transmission of bits (a bitstream) between RSs. A second layer (IRIP-L2) 212 links a third layer with the first layer. The third layer (IRIP-L3) 214 provides mechanisms for transferring various signals that the two RSs exchange to perform the handover.

Because the anchor RS is the single interface between the wireless communication network 104 and the switched telephone network 102, the anchor RS is informed of any service requests related to the call (i.e., call waiting, three way calling, etc.) so that these service requests may be invoked from the switch 112. These service related operations are preferably handled by AIP-L3. For example, sending a three way call may involve the SU 126 sending a Call Request message to the serving RS 122" using AIP-L3 protocol. This message should reach the anchor RS 122' as soon as possible so that the anchor RS can invoke the three way calling actions between the wireless network 104 and the telephone network 102. Appendix B is a table setting out which RS handles certain air interface functions according to a preferred protocol architecture 200.

The architecture 200 of FIG. 8 also has four new groups of functions, called "functional entities". These entities are:

(1) Mapping Entity-Serving (ME-S) 216, which is located in the serving RS to get AIP-L3 messages from the AIP-L2 protocol and provides them to the IRIP-L2 protocol;

(2) Mapping Entity-Anchor (ME-A) 218, which is located in the anchor RS 122' to bridge between AIP-L3 messages and CIP-L3 messages;

(3) Handover Manager-Serving (HM-S) 220, which is located in the serving RS to translate AIP-L2 messages to the IRIP-L3 messages; and (4) Handover Manager-Anchor (HM-A) 222, which is located in the anchor RS to translate IRIP-L3 messages to the appropriate CIP-L3 messages.

III. Functional Entities

The "functional entities" are the additional functions used in performing the RS-to-RS handover. The functional entities are the handover managers (HM-S, HM-A) and mapping entities (ME-S, ME-A) described in relation to FIG. 8.

A. Mapping Entity-Anchor

The ME-A 218 coordinates AIP-L3 messages with the CIP-L3. As seen in FIG. 8, the IRI sits between AIP-L2, which resides in the serving RS, and AIP-L3, which resides in the anchor RS. IRI is based on a protocol (IRIP) for transferring messages between the AIP-L2 in the serving RS and the AIP-L3 and CIP-L3 in the anchor RS.

The ME-A 218 functions include receiving information from AIP-L3, formulating appropriate messages for the network, receiving information from the CIP, and formulating appropriate responses which are sent to the serving RS via the IRI for delivery to the SU 126 across the air interface.

The AIP-L3 may deliver messages to the ME-A, preferably with its header field stripped (headers are discussed below with reference to FIG. 10). The ME-A decodes the message and its parameters or information elements using, for example, a lookup table. Once the ME-A decodes the message, it prepares an appropriate response using, for example, a lookup table, and transmits the response to the switched telephone network 102 via the CIP. This response may include a message for the switch 112, the VLR 124, access manager 109, or other network device or peripheral.

The CIP-L3 may deliver messages to the ME-A via the RS/switch interface. The ME-A decodes the message and its parameters or information elements using, for example a lookup table. Once the ME-A decodes the message, it takes an appropriate action using, for example, a lookup table. This action may include preparing and sending a message back to the telephone network 102 or formulating a message for the SU 126 to be sent via AIP-L3. The ME-A delivers to the SU the messages preferably without the headers stripped using AIP-L3.

B. Mapping Entity-Server

The ME-S 216 provides a simple relay between the AIP-L2 and the IRIP-L2 for coordinating the transport of AMP-L3 messages in the serving RS. When the SU sends an AIP-L3 message with headers, the ME-S receives it from the AIP-L2 protocol and submits it to IRIP-L2 for transmission to the anchor RS via the IRI. The ME-S may receive AIP-L3 messages with headers from the IRIP-L2 protocol in the anchor RS via the IRI and submits them to AIP-L2 for transmission to the SU 126 via the air interface.

C. Handover Manager-Anchor

The HIM-A 222 includes a set of functions supporting the operation and management of the anchor-based handover procedures in the anchor RS. The HM-A communicates with the CIP-L3 and IRIP-L3. The HM-A receives appropriate information to manage the handover process and prepares appropriate messages to be sent to the telephone network 102 using CIP protocol, according to the air interface protocol being used. The HM-A may receive messages from the CIP and prepare appropriate messages to be sent to the serving RS using IRIP-L3, as discussed regarding IRIP-L3 below. The HM-A may also manage resources for facilitating the anchor-based handover procedure. This depends on the specific implementation used.

D. Handover Manager-Server

The HM-S 220 includes a set of functions supporting the operation and management of the anchor-based handover procedures in the target/serving RS. The HM-S communicates with IRIP-L3 and AIP-L2. The HM-S receives appropriate information from the SU for AIP-L2 to manage the handover process and prepares appropriate messages to be sent to the anchor RS using IRIP-L3. The HM-S may receive messages from the anchor RS via IRIP-L3 and prepares appropriate messages to the SU 126 using AIP-L2. The HM-S may also manage resources in the serving RS for facilitating the anchor-based handover procedures. This depends on the specific implementation used.

IV. The Inter-Radio System Interface Protocol Layer 1

IRIP-L1 210 is responsible for the physical transmission of bits (a bitstream) between RSs. The transmission path for the bitstream may be established using well known specifications and guidelines. Such specifications and guidelines are attached as Appendix C. The contents of these documents are incorporated herein by reference.

Figure 9A:
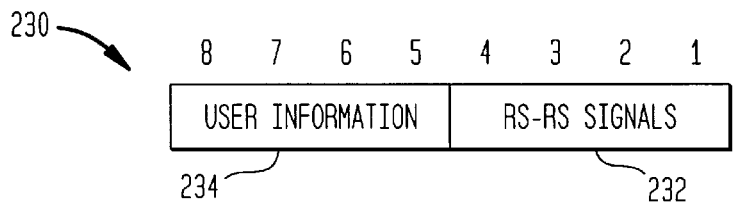
FIGS. 9A and 9B illustrate preferred inter-RS signal frame structures.
Figure 9B:
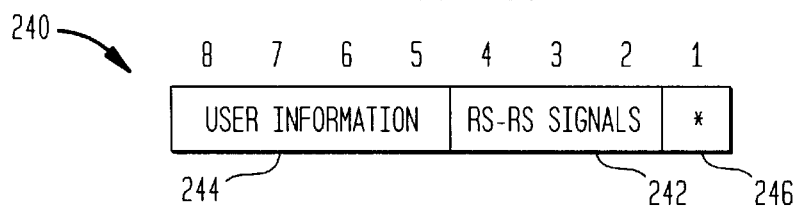

FIGS. 9A and 9B illustrate preferred RS-RS signal frame structures. FIG. 9A is a preferred frame structure 230 where a 64 kb/s channel is used. The signaling subchannel 232 may be 32 kb/s wide and occupy kilobyte positions 1–4. User information 234 (such as the voice message) may occupy kilobyte positions 5–8. FIG. 9B is a preferred frame structure 240 where a 56 kb/s channel is used. The signaling subchannel 242 may be 24 kb/s wide and occupy kilobyte positions 2–4. User information 244 (such as the voice message) may occupy kilobyte positions 5–8. Bit position 1 246 may be used for robbed bit signaling or A/B bit signaling.

Multiplexing and demultiplexing the user information and RS-RS signaling subchannels into a 64 kb/s channel transmission line, such as an ISDN B-channel may be performed using well known specifications and guidelines. Such specifications and guidelines are attached as Appendix D. The contents of these documents are incorporated herein by reference.

V. The Inter-Radio System Interface Protocol Layer 2

IRIP-L2 212 links IRIP-L1 210 with IRIP-L3 214. IRIP-L2 performs data framing, error checking, and transmission functions to transport IRIP-L3 214 messages between RSs. These functions are performed by many well known Layer 2 protocols, such as Link Access Procedures for B Channel (LAPB), Link Access Procedures for D Channel (LAPD), Link Access Procedures for F Channel (LAPF), and the like. Because IRIP-L2 212 carries AIP-L3 messages transparently, multiplexing/demultiplexing should be provided so that IRIP-L3 and AIP-L3 messages may be handled. LAPD and LAPF, for example, provide this function.

In a preferred embodiment, LAPD for ISDN is used for IRIP-L2 212. Appendix E sets out documents describing LAPD. The contents of these documents are incorporated herein by reference.

LAPD was chosen for several reasons. First, LAPD provides reliable transport of L3 messages. Second, in a preferred embodiment, the anchor RS uses LAPD for D channel signaling with the switch. Third, integrated circuit chips designed to perform LAPD are commercially available from Western Digital, Motorola, and other manufacturers. The functions described below follow the procedures specified in TR-TSY-000793, *ISDN D-Channel Exchange Access Signaling and Switching Requirements* (Layer 2), Issue 1 (Bellcore, October 1988)("TR-TSY"), unless otherwise indicated.

The IRIP-L2 frame structure, format, and command responses follow TR-TSY. The subset of LAPD commands used in IRIP-L2 are described in ITU-T Recommendation Q.921, *ISDN User-Network Interface Data Link Layer—Specification*, ITU-T Blue Book (1988). Information transfer follows the "multiple-frame-extended-mode" (MFEM) operation described in ITU-T Recommendation Q. 921. In MFEM, sequentially numbered frames are exchanged and acknowledged between RSs. Attached as Appendix F is a list of IRIP-L2 values according to a currently preferred embodiment of the present invention.

VI. The Inter-Radio System Interface Protocol Layer 3

IRIP-L3 214 provides mechanisms for exchanging various signals between RSs to perform the handover. The IRIP-L3 functions, message set, and parameters are discussed.

A. IRIP-L3 Functions

The IRIP-L3 214 performs functions to exchange the RS-to-RS signaling messages. IRIP-L3 receives commands from and provides responses to the HM-S 220 and HM-A 222 (see FIG. 8). The HM-S 220 communicates with the AIP-L2 between the SU and serving RS and IRIP-L3 between the serving RS and the anchor RS to send and receive information necessary to formulate the appropriate signals to be exchanged. The HM-A 222 communicates with the IRIP-L3 between the anchor RS and the serving RS and CIP-L3 between the anchor RS and the switch to send and receive appropriate information used in the handover signals. The handover managers 220, 222 are responsible for procedures for initiating transmitted signals and reacting to received signals.

The following are signals preferably used in an anchor-based handover:

(1) The target RS signals the anchor RS to begin executing a handover by identifying the radio call identifier (a unique identifier for a communication) and requesting that the bridging function be performed.

(2) The anchor RS sends a message acknowledging receipt of the radio call identifier and indicating that the bridging function is being performed.

(3) The target RS informs the anchor RS when the bridging is complete.

(4) The target RS informs the anchor RS when the handover is complete (e.g., when the user information path is resumed on the new path).

B. IRIP-L3 Messages

The functions described above are carried out using the following messages:

IRIP REQUEST: Used by the target RS to provide the anchor RS with the radio call identifier for the call needing a handover and to request the bridging.

IRIP REQUEST ACK: Used by the anchor RS to acknowledge receipt of the radio call identifier.

IRIP EXECUTE: Used by the anchor RS to notify the target RS that the bridging is complete.

IRIP COMPLETE: Used by the target RS to inform the anchor RS that the handover is complete.

Figure 10:
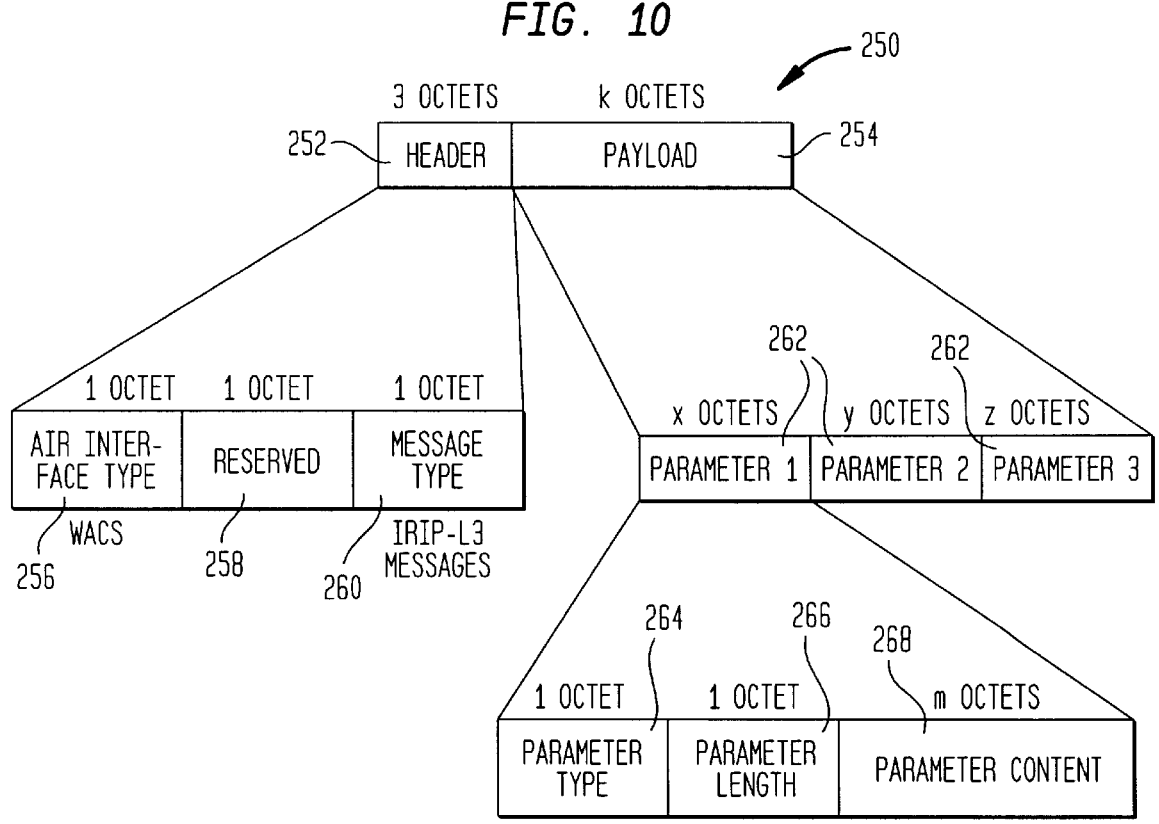
FIG. 10 illustrates a preferred IRIP-L3 message format.
Figure 11:
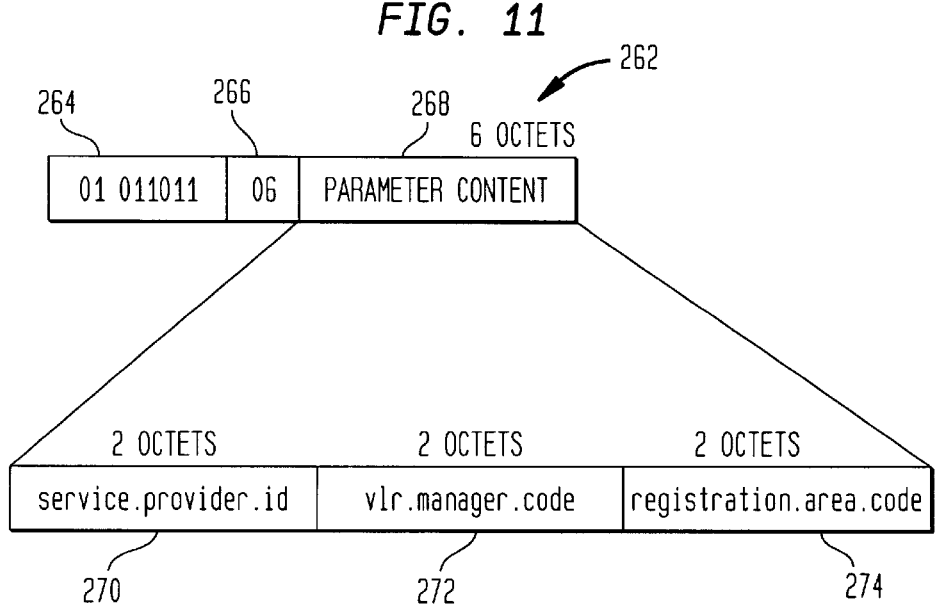
FIG. 11 illustrates the parameter content portion of an IRIP-L3 message.

FIG. 10 illustrates a preferred IRIP-L3 message 250 format. The message 250 has a header 252 and a payload 254. The header may be 3 octets long and have three subfields: air interface type 256, reserved 258, and message type 260. The air interface subfield 254 is a single octet used to indicate the type of air interface technology between the SU 26 and the RS 122. For example, the following bit positions may be used:

| 8 | 7 | 6 | 5 | 4 | 3 | 2 | 1 | Air Interface Type |
|---|---|---|---|---|---|---|---|---|
| 0 | 0 | 0 | 0 | 0 | 0 | 0 | 1 | PACS |
| 0 | 0 | 0 | 0 | 0 | 0 | 1 | 0 | IS-95 |
| 0 | 0 | 0 | 0 | 0 | 0 | 1 | 1 | IS-54 |
| 0 | 0 | 0 | 0 | 0 | 1 | 0 | 0 | GSM |
| 0 | 0 | 0 | 0 | 0 | 1 | 0 | 1 | DECT |
| 0 | 0 | 0 | 0 | 0 | 1 | 1 | 0 | OMNIPOINT |

The reserved field 258 is a single octet that may be used for proprietary information.

The message type field 260 is a single octet identifying the type of IRIP-L3 massage contained in the frame. For example, the following bit positions may be used:

| 8 | 7 | 6 | 5 | 4 | 3 | 2 | 1 | Message Type |
|---|---|---|---|---|---|---|---|---|
| 1 | 0 | 0 | 1 | 0 | 0 | 0 | 0 | IRIP REQUEST |
| 1 | 0 | 1 | 0 | 0 | 0 | 0 | 0 | IRIP REQUEST ACK |
| 0 | 0 | 0 | 1 | 0 | 1 | 0 | 1 | IRIP EXECUTE |
| 0 | 0 | 0 | 1 | 0 | 0 | 1 | 1 | IRIP COMPLETE |

The payload 254 comprises one or more parameter fields 262. Each parameter field 262 includes three subfields: a parameter type field 264, a parameter length field 266, and a parameter content field 268.

The parameter type field 264 is a single octet identifying the parameter set out in the parameter field 262. For example, the following bit positions may be used to identify between parameter types (the parameter types are described below):

| 8 | 7 | 6 | 5 | 4 | 3 | 2 | 1 | Parameter Type | Max. Length |
|---|---|---|---|---|---|---|---|---|---|
| 0 | 0 | 0 | 0 | 0 | 0 | 0 | 0 | system.specific.info | 100 octs |
| 0 | 1 | 0 | 1 | 0 | 0 | 1 | 0 | radio.call.info | 5 octs |
| 0 | 1 | 0 | 1 | 0 | 0 | 1 | 1 | user.info.type | 1 oct |
| 0 | 1 | 0 | 1 | 1 | 0 | 1 | 1 | registration.area.id | 8 octs. |
| 0 | 1 | 0 | 1 | 1 | 1 | 0 | 1 | anch.rs.dn | 5 octs |
| 0 | 1 | 1 | 1 | 1 | 1 | 1 | 1 | bandwidth.req | 1 oct |

The parameter length field 266 is a single octet identifying the number of octets in the parameter content field 268 that follows. The parameter content field 268 contains information about the parameter identified in the parameter type field 264.

The parameter field 262 contains information to set up and conduct the handover. If more than one parameter field 262 is in a payload 254, the order in which parameter fields are carried has no significance. Preferably, each message 250 carries a radio.id.call parameter, which identifies the call to which the message pertains.

C. IRIP-L3 Parameters

The parameter content field 268 of the parameter field 262 varies depending on the parameter. Registration.area.id parameter is preferably a 6 octet code distinguishing registration areas. FIG. 11 illustrates a preferred parameter field 262 containing registration.area.id. A registration.area.id preferably contains three 2-octet subfields: the service.provider.id 270; the vlr.manager.code 272; and the registration.area.code 274. The service.provider.id 270 identifies the service provider (i.e., the wireless communications company). The vlr.manager.code 272 may be used to uniquely identify a visiting location register (VLR) 124 from other VLRs. This may be used in inter-RS handovers that also travel to an area covered by a different VLR 124. The registration.area.code may be assigned by a service provider to identify a registration area that the SU is in.

The bandwidth.req parameter may be a single octet identifying the channel rate requested during the handover initiation process. The anchor.rs.dn parameter is a 24 bit (3 octet) directory number (DN) reserved for a group of B channels used during the handover. The user.info.type indicates whether the user information is voice or data.

The radio.call.id parameter is a 24 bit (3 octet) number uniquely identifying the radio call to all wireless communications and telephone network components. An unambiguous identification for each call is desired because the handover procedures may hand the call from RS to RS. The id is randomly generated during call establishment at the time the encryption algorithm is allocated. The id is used for all subsequent exchanges of the call throughout the call's duration.

IRIP REQUEST messages should carry the following parameters: anchor.rs.dn; user.info.type; bandwidth.req; and registration.area.id parameters. The anchor.rs.dn parameter identifies a directory number of the anchor RS, which uniquely identifies the anchor RS. The user.info.type parameter identifies the type of communication that is being handed over (e.g., voice or data communication). The bandwidth.req parameter identifies bandwidth requested during the handover. The registration.area.id parameter identifies the CA 120 in which the SU 126 is currently registered.

IRIP REQUEST ACK messages should carry the bandwidth.req parameter. IRIP EXECUTE and IRIP COMPLETE messages should carry the anchor.rs.dn parameter. The system.specific.info parameter is optional in all message types. The system.specific.info parameter may include air interface specific, system specific, and/or manufacturer specific information.

A table of preferred mandatory and optional message parameters is:

| MESSAGE TYPE | PARAMETERS | M/O |
|---|---|---|
| IRIP REQUEST | system.specific.info | O |
| | radio.call.id | M |
| | anchor.rs.dn | M |
| | user.info.type | M |
| | bandwidth.req | M |
| | registration.area.id | O |
| IRIP REQUEST ACK | system.specific.info | O |
| | radio.call.id | M |
| | bandwidth.req | M |
| IRIP EXECUTE | system.specific.info | O |
| | radio.call.id | M |
| | anchor.rs.dn | M |
| IRIP COMPLETE | system.specific.info | O |
| | radio.call.id | M |
| | anchor.rs.dn | M |

VII. Generic Call Flows

This section provides call flows for the anchor RS-based handover procedure. First, handover scenarios are described. Second, call flows for establishing an IRI are provided. Third, call flows for handovers in each of the described scenarios are provided.

A. Scenarios and Conventions

Three scenarios are considered:

(1) handover-forward;

(2) handover-to-third; and (3) handover-back-to-anchor.

Figure 12A:
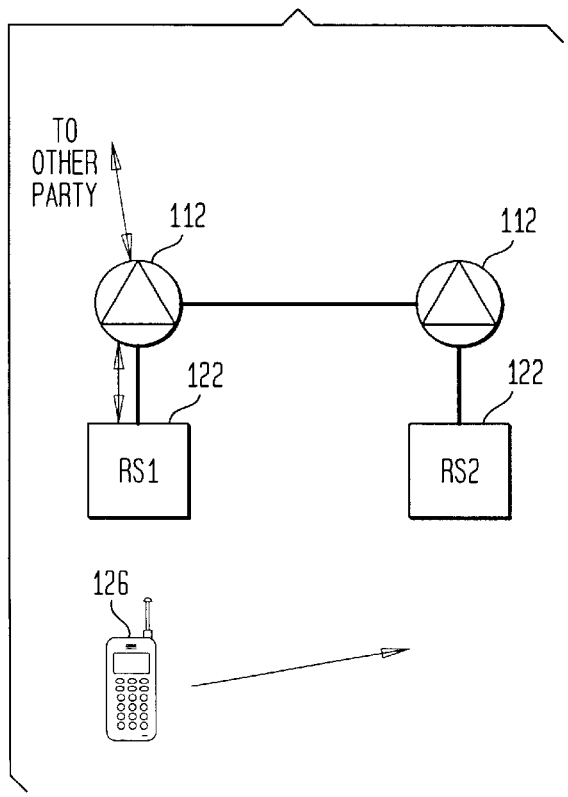
FIGS. 12A and 12B illustrate a handover-forward scenario.
Figure 12B:
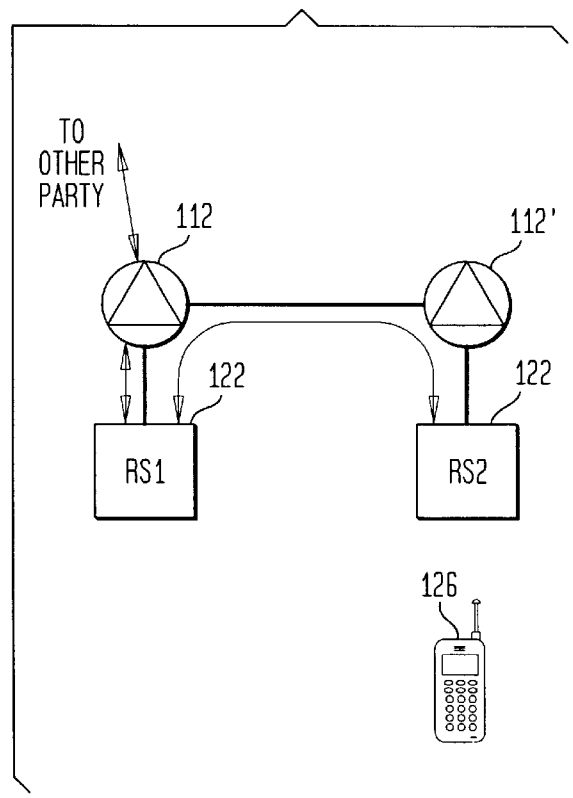

FIGS. 12A and 12B illustrate a handover-forward scenario. As illustrated in FIG. 12A, a SU 126 initiates a call while in a first RS (RS1), connected to a first switch 112. RS1 becomes the anchor RS and is also the serving RS. The SU travels towards a second RS (RS2) connected a second switch 112', which RS becomes the target RS. The call is to be handed-over from the anchor RS (RS1) to the target RS (RS2). FIG. 12B illustrates the connections after the handover. The SU 126 is in wireless communication with RS2, which has become the serving RS. The call is sent from RS2 to the second switch 112', to the first switch 112, to RS1. The call is then sent from the anchor RS (RS1) to the telephone network via the first switch 112.

Figure 13A:
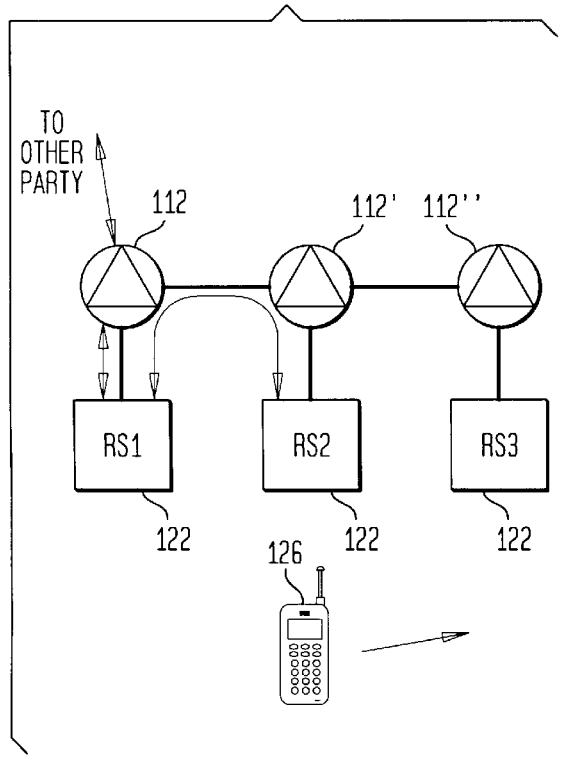
FIGS. 13A and 13B illustrate a handover-to-third scenario.
Figure 13B:
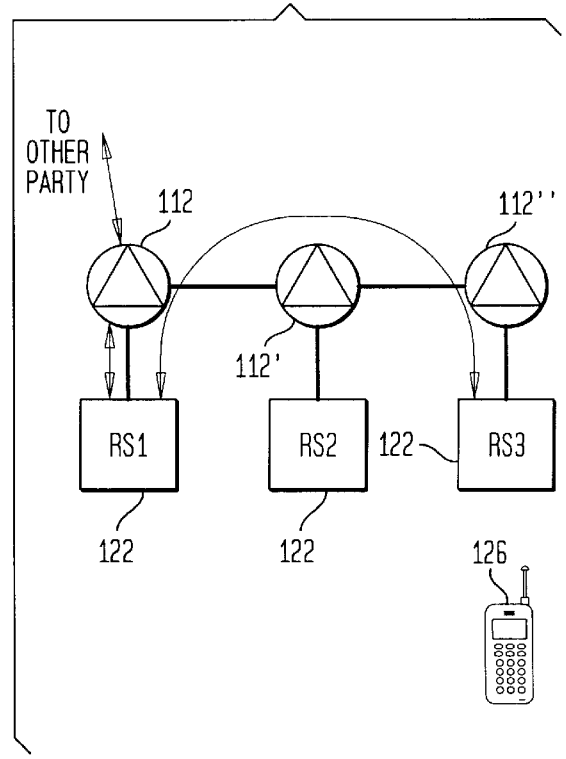

FIGS. 12A and 12B illustrate a handover-to-third scenario. FIG. 13A illustrates the call described in FIG. 12B at a time when RS2 is acting as the serving RS. The SU travels towards RS3 connected to a third switch 112". RS3 becomes the target RS. The call is to be handed over from the serving RS (RS2) to the target RS (RS3). FIG. 13B illustrates the connections after the handover. The SU 126 is in wireless communication with RS3, which has become the serving RS. The call is sent from the third switch 112" to the first switch 112. The path between the anchor RS (RS1) and the old serving RS (RS2) is disconnected. The second switch 112' connected to RS2 is eliminated from the communication path. The call is sent from the anchor RS to the telephone network via the first switch 112 connected to the anchor RS.

Figure 14A:
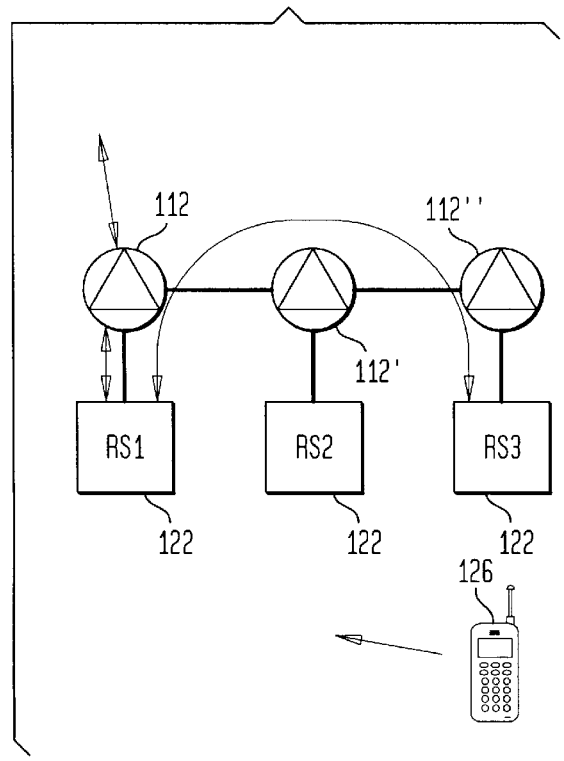
FIGS. 14A and 14B illustrate a handover-back to a non-anchor scenario.
Figure 14B:
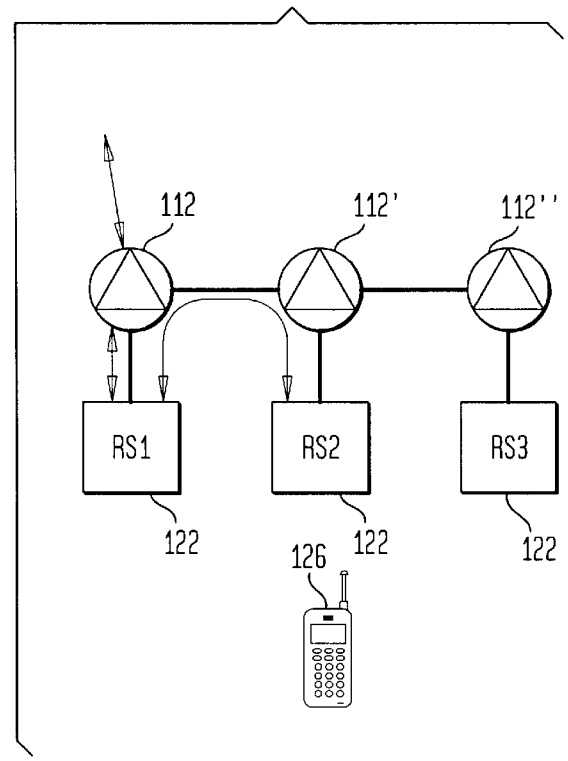

FIGS. 14A and 14B illustrate a handover-back to a non-anchor. The call flows for this are substantially the same as a handover-forward and these call flows are not described. As seen in FIG. 14A, RS3 is the serving RS and RS2 is the target RS. As seen in FIG. 14B, when the handoff is complete, RS2 is the serving RS and RS3 and its switch 112" are eliminated from the communication path.

FIGS. 15A and 15B illustrate a handover-back-to-anchor. As seen in FIG. 15A, RS2 is the serving RS. The SU 126 moves towards RS1. The RS1 is the anchor RS and is now also the target RS. The call is to be handed over from the serving RS (RS2) to the target RS (RS1). FIG. 15B illustrates the connections after the handover. The call is handled entirely by RS1, which is now both the serving RS and the anchor RS. No other RS or switch is in the communication path between the SU and telephone network.

The following generic interface messages are used to describe the call flows:

| Generic Message Name | Description |
| --- | --- |
| handover.request | The SU requests or orders a handover to a new RS |
| handover.request.ack | The RS acknowledges the handover request |
| handover.execute | The serving and target RSs instruct the SU to switch to new serving (target) RS |
| suspend.talk.path | The SU requests the anchor RS to suspend the communication |
| resume.talk.path | The SU requests the anchor RS to resume the communication |
| access.release | The SU informs the old serving RS that it will release its radio channel |
| handover.complete | The new serving RS informs the SU that the handover is complete |
| anchor.dn.update | The new serving RS passes the DN of the anchor RS to the SU |
| anchor.dn.update.ack | The SU acknowledges receipt of the anchor.dn.update message |

B. Call Flows

The call flows performing inter-RS handovers in the scenarios described above (except handover-back to a non-anchor) are provided assuming a generic air interface protocol and a generic RS/switch protocol. IRI flows are indicated using thick arrows. IRIP messages are shown in capital letters.

1. IRI Transmission Path Establishment and Disconnection Call Flows

Regardless of the scenario, an IRI transmission path should be established, and often one is disconnected. Thus, the call flows for establishing and disconnecting an IRI transmission path are provided before specific scenarios are discussed.

When setting up or tearing down an IRI nailed-up handover interface (either direct connection or switch loopback), no messages are exchanged between RSs. Messages internal to the RS may be used to establish IRI connections. For example, an RS should (1) determine which nailed-up channels are available and select one of these available channels, and (2) prevent "glaring", a situation where different RSs choose the same channel for different handovers. A person skilled in the art recognizes that there are many ways to accomplish these tasks. One manner in which these may be accomplished is attached as Appendix G.

When setting up an IRI on-demand handover interface using a NI-1 (or higher), BRI, or PRI B channel, the following messages are used. First, each RS is assumed to have a single directory number (DN) reserved for anchor-based handovers.

Assume that a decision is made to handover a communication to a new (target) RS, and that the anchor.rs.dn and radio.call.id are available to the target RS. FIG. 16 illustrates an exemplary call flow 300 for establishing an IRI interface for an on-demand transmission path.

The target RS sends to the switch connected to the target RS an ISDN SETUP message (an ISDN message to set up a B channel, see Appendix C) having the appropriate parameters (step 302), such as setting the parameter anchor.rs.dn equal to the telephone number of the called party (Called Party Number=anchor.rs.dn). The switch sends to the anchor RS an ISDN SETUP message (step 304). The anchor RS responds with an ISDN CONNECT message (step 306). When the target RS receives the ISDN CONNECT message (step 308), it initiates IRIP-L2 start-up procedures. When these procedures are completed, IRIP-L2 is operational on the IRI.

FIG. 17 illustrates an exemplary call flow 310 for tearing down an IRI on-demand handover interface using a NI-1 (or higher), BRI, or PRI B channel. When the anchor RS determines that the IRI serving the old serving RS is no longer needed, the anchor RS begins IRIP-L2 procedures to disconnect Layer 2 on the IRI with the old serving RS. When the IRIP-L2 disconnection procedures are completed, the anchor RS initiates the IRI tear down procedures as follows.

The anchor RS sends an ISDN DISC message (an ISDN message to disconnect a B-channel, see Appendix C) to the switch connected to the anchor RS (step 312). The switch forwards the ISDN DISC message to the old serving RS (step 314). The old serving RS sends an ISDN REL (an ISDN message to release a channel, see Appendix C) message to the switch (step 316), which is forwarded to the anchor RS (step 318). The anchor RS sends an ISDN REL COM (an ISDN message confirming the release of a channel, see Appendix C) message to the switch (step 320), which is forwarded to the old serving RS (step 322). When the old serving RS receives the ISDN REL COM message, it releases the resources (i.e., communications lines, processor memory) allocated for the IRI. At this point, the path between the anchor RS and the old serving RS no longer exists.

If the transmission path has a 56 kb/s bandwidth, the procedures used are set out in TR-880-22135-84-01, *Circuit Switched Digital Capability Network Access Interface Specifications—Switched Network Compatibility and Performance Specification for 2— Wire Connection to the Digital Public Switched Network*, Issue 1 (Bellcore, July 1984).

The contents of that document are incorporated herein by reference.

2. Handover-Forward Call Flows

Figure 18:
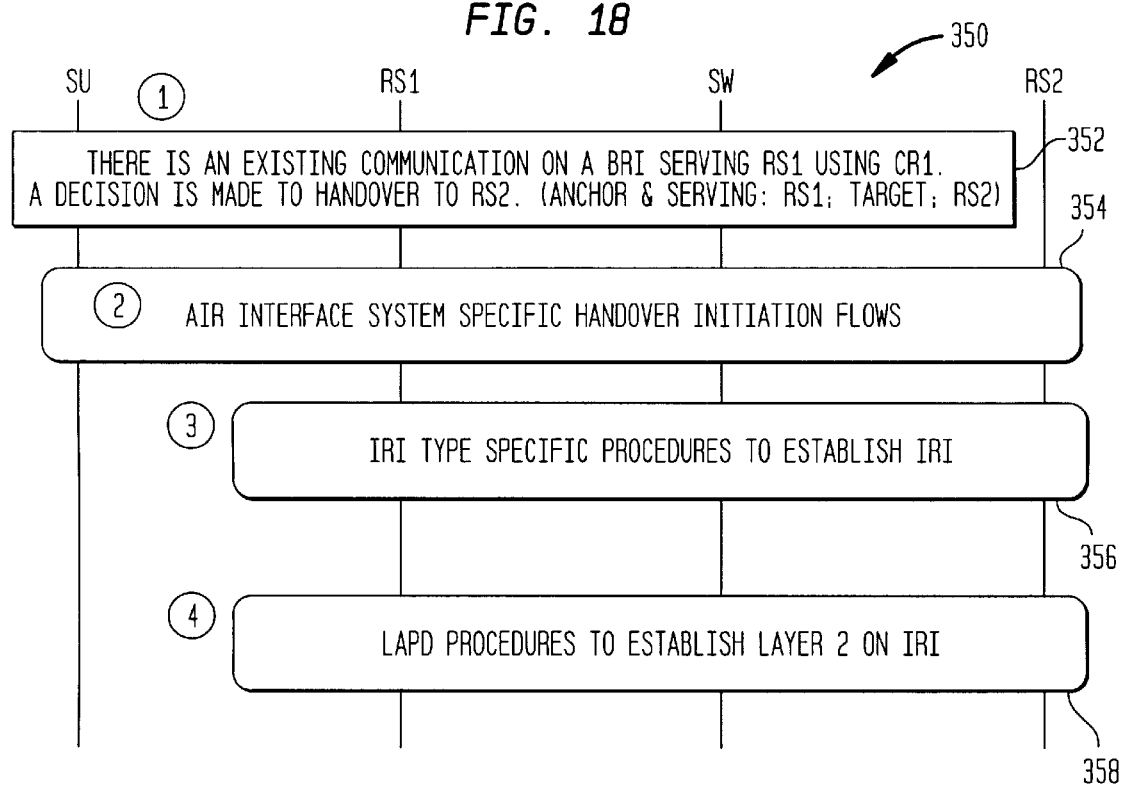
FIG. 18 illustrates an exemplary handover installation call flow for a generic handover-forward scenario.

In a handover-forward scenario, as illustrated in FIGS. 12A and 12B, several call flows should occur. FIG. 18 illustrates an exemplary handover initiation call flow 350 for a generic handover-forward scenario.

An existing call between a SU and another party is to be handed over from the anchor/serving RS (RS1) to another RS (RS2). RS2 becomes the target RS (step 352). Air interface, radio system specific handover initiation procedures take place (step 354). The target RS is informed of the initiation by one of the SU, the anchor RS, or the network. When the target RS is informed of the initiation, it begins IRI-specific procedures to establish a transmission path (step 356) as described in Section VII, B1 above. The procedures used may vary if a nailed-up or on demand connection is used (see Section VII, B1 above). Once the transmission path is established, the IRIP-L2 link setup procedures occur (step 358).

Figure 19:
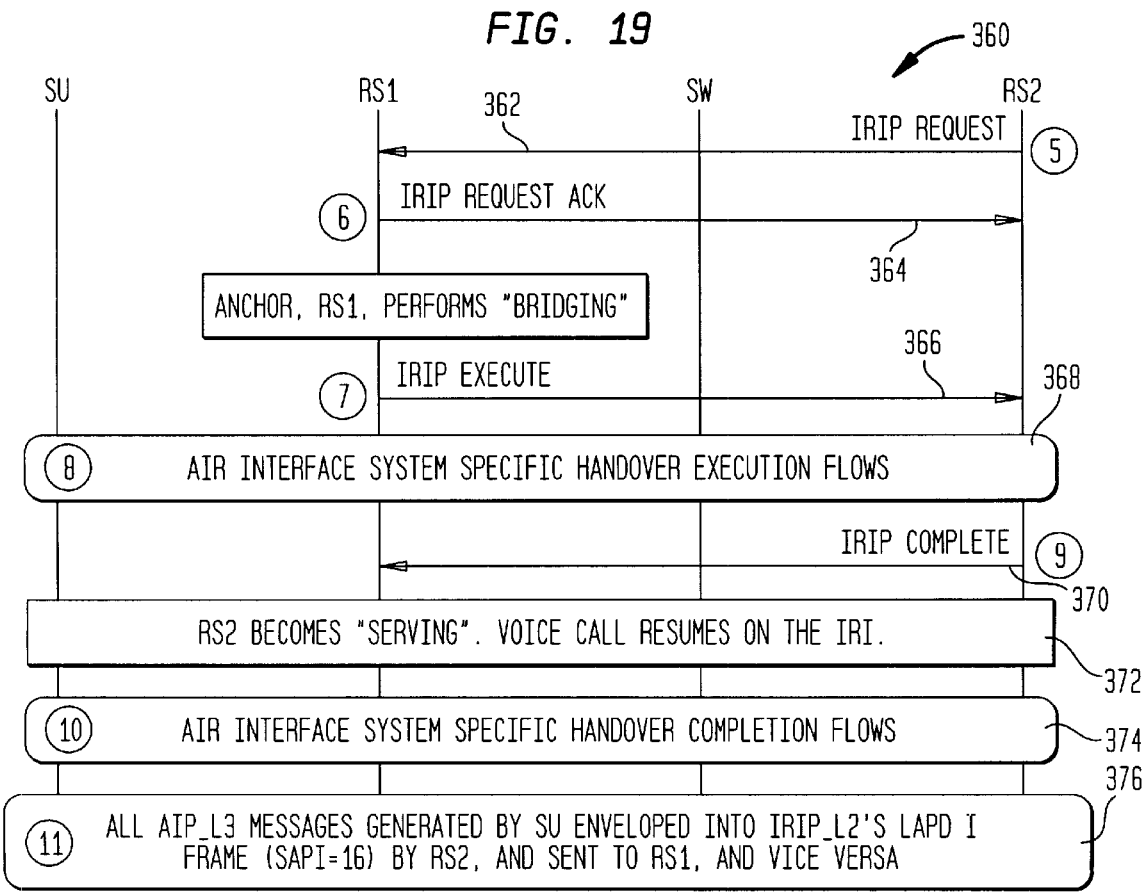
FIG. 19 illustrates an exemplary handover execution and completion call flow for a generic handover-forward scenario.

FIG. 19 illustrates an exemplary handover execution and completion call flow 360 for a generic handover-forward scenario. When the IRIP-L2 establishes a link, the target RS sends to the anchor RS an IRIP-L3 IRIP REQUEST (step 362), signaling the radio.call.id and requesting the anchor RS to bridge the call to the transmission path just established. The anchor RS acknowledges the IRIP REQUEST signal (step 364) and begins the bridging process. The anchor RS informs the target RS when the bridging is complete with an IRIP EXECUTE message (step 366). The target RS may begin the handover execution process and AIP-L2 call flows take place (step 368).

When the handover is complete, the target RS (now the serving RS) sends to the anchor RS an IRIP COMPLETE message (step 370). The user information is now routed from the new serving RS to the anchor RS (step 372). AIP-L3 call flows may occur to complete the handover (step 374). For example, anchor.rs.dn may be sent to the SU. Once the handover completion calls are exchanged, all AIP-L3 messages from the SU are placed in IRIP-L2 format by the anchor RS and sent to the new serving RS for processing (step 376).

FIG. 20 illustrates an exemplary disconnection call flow 380 for a generic handover-forward scenario. Assume that a SU desires to end a call (step 382). The SU may issue to the serving RS an AIP-L3 disconnect message (step 384). The serving RS packages the AIP-L3 disconnect message into an IRIP-L2 message and forwards it to the anchor RS (step 386).

When the anchor receives the IRIP-L2 disconnect message, it understands that the message is an AIP-L3 message and delivers it to the AIP-L3 protocol. The anchor RS determines that the SU has requested disconnection. The anchor RS begins a disconnection process. This disconnection process may involve air interface specific call flows (step 388). The call is cleared from the wireless communication network and the switched telephone network. Once the call is cleared, the anchor RS determines that the IRI is no longer needed, and the anchor RS begins IRIP-L2 disconnection procedures (step 390). The disconnection procedures take place (step 392), as described in Section VII, B1. These procedures vary if the transmission path is nailed-up or on-demand (see Section VII, B1). The HLR 110, VLR 124, or other network peripheral may need to be updated to include information about the current location and status of the SU 126 (step 394).

3. Handover-to-Third Call Flows

In a handover-to-third scenario, as illustrated in FIGS. 13A and 13B, several call flows should occur. FIG. 21 illustrates an exemplary handover initiation call flow 400 for a generic handover-to-third scenario. Assume that a call is in progress, and a first RS (RS1) is the anchor RS. The SU is currently being served by a second RS (RS2), and a decision is made to handover the call to a third RS (RS3)(step 402). RS3, therefore, is the target RS.

Air interface specific and radio system specific handover initiation procedures take place (step 404). A handover.request message may be sent to the target RS by the SU, anchor RS, or network (step 406)(FIG. 21 shows the message coming from the SU). The target RS acknowledges the handover.request by sending a handover.request.ack to the origin of the request (e.g., the SU, anchor RS, or network) (step 408).

When the target RS is informed of the handover request, it begins establishing the digital transmission path (step 410) as described in Section VIII, B1 above. The procedures used may vary if a nailed-up or on demand connection is used (see Section VII, B1). At this time, there are two signal transmission paths: one between the anchor RS and the serving RS and one between the anchor RS and the target RS. Only a single user information path exists: from the anchor RS to the serving RS. Once the transmission path is established, IRIP-L2 link setup procedures occur (step 412).

FIG. 22 illustrates an exemplary handover execution and completion call flow 420 for a generic handover-to-third scenario. When the IRIP-L2 establishes a link, the target RS sends to the anchor RS an IRIP-L3 IRIP REQUEST (step 421), signaling the radio.call.id and requesting the anchor RS to bridge the call to the transmission path just established. The anchor RS acknowledges the IRIP REQUEST signal (step 422) and begins the bridging process. The anchor RS informs the serving RS that the bridging is complete with an IRIP EXECUTE message (step 424). The serving RS may begin the handover execution process. At the same time, the anchor RS also sends to the target an IRIP EXECUTE message (step 426). The target RS may begin the handover execution process.

At this time, AIP-L2 call flows occur between the SU and serving RS which may include a handover.execute command (step 428). The SU may respond to the serving RS with an access.release command (step 430), indicating that the radio channel resources for the call between RS2 and the SU are released. When the serving RS releases the channel resources, the serving RS sends to the anchor RS an IRIP-L3 IRIP COMPLETE message (step 430). The anchor RS begins to disconnect the signal transmission path between it and the old serving RS (RS2) (step 343), as described in Section VII, B1. The procedures vary if the transmission path is nailed-up or on-demand (see Section VII, B1). IRIP-L2 procedures to disconnect layer 2 from the old serving RS to the anchor RS are started (step 436).

At the time the target RS (RS3) receives the IRIP EXECUTE message (step 426), it starts AIP-L3 calls. It may, for example, send to the SU a handover.execute (step 348) message. The SU may respond with a handover.complete message (step 440). When the handover execution is complete and the target RS is notified, the target RS sends to the anchor RS an IRIP-L3 message IRIP COMPLETE (step 442). The target RS (RS3) is now the serving RS and the user information is routed from the SU to RS3 to RS1 to the telephone network (step 444).

AIP-L3 call flows may occur to complete the handover (step 446). For example, anchor.rs.dn may be sent to the SU. Once the handover completion calls are exchanged, all AIP-L3 messages from the SU are placed in IRIP-L2 format by the anchor RS and sent to the new serving RS for processing (step 448).

The disconnection call flows are the same as in the handover-forward scenario discussed above in relation to FIG. 20.

4. Handover-Back-To-Anchor Call Flows

Figure 23:
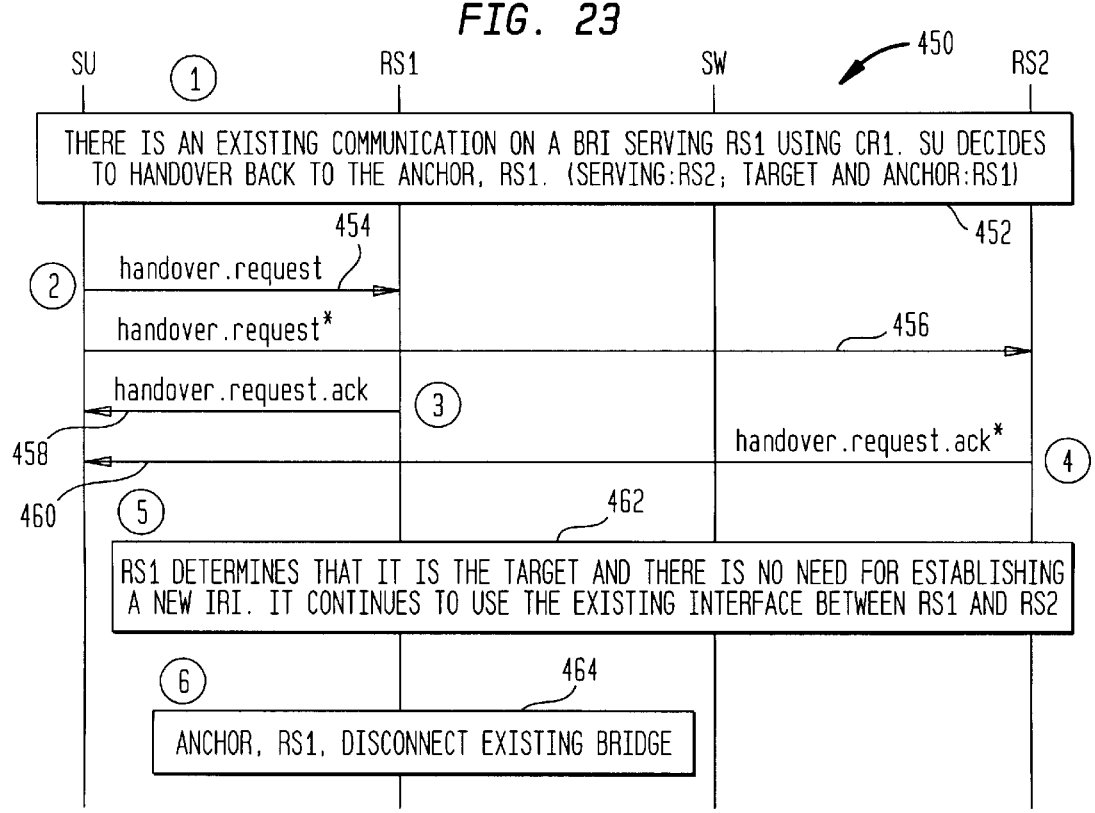
FIG. 23 illustrates an exemplary handover initiation call flow for generic handover-back-to-anchor scenario.

In a handover-back-to-anchor scenario, as illustrated in FIGS. 15A and 15B, several call flows should occur. FIG. 23 illustrates an exemplary handover initiation call flow 450 for a generic handover-back-to-anchor scenario. Assume that a call is in progress, and a first RS (RS1) is the anchor RS. The SU is currently being served by a second RS (RS2), and a decision is made to handover the call back to the first RS (RS1)(step 452). RS1, therefore, is both the serving RS and the target RS.

Air interface specific and radio system specific handover initiation procedures take place (step 454). A handover.request message may be sent to the target RS by the SU, anchor RS, or network (FIG. 23 shows the message coming from the SU). The SU may also send to the serving RS (RS2) a handover.request (step 456). The target RS acknowledges the handover.request by sending a handover.request.ack to the origin of the request (e.g., the SU, anchor RS, or network)(step 458). The serving RS also acknowledges the handover.request message, if it received one, by also issuing a handover.request.ack message (step 460).

RS1 determines that it is the target RS and no IRI is needed. The existing interface between RS1 and RS2 is used for exchanging signals (step 462). The anchor RS begins the bridging process by bridging the new air channel to the call and disconnecting the old handover air channel from the call (step 464).

Figure 24:
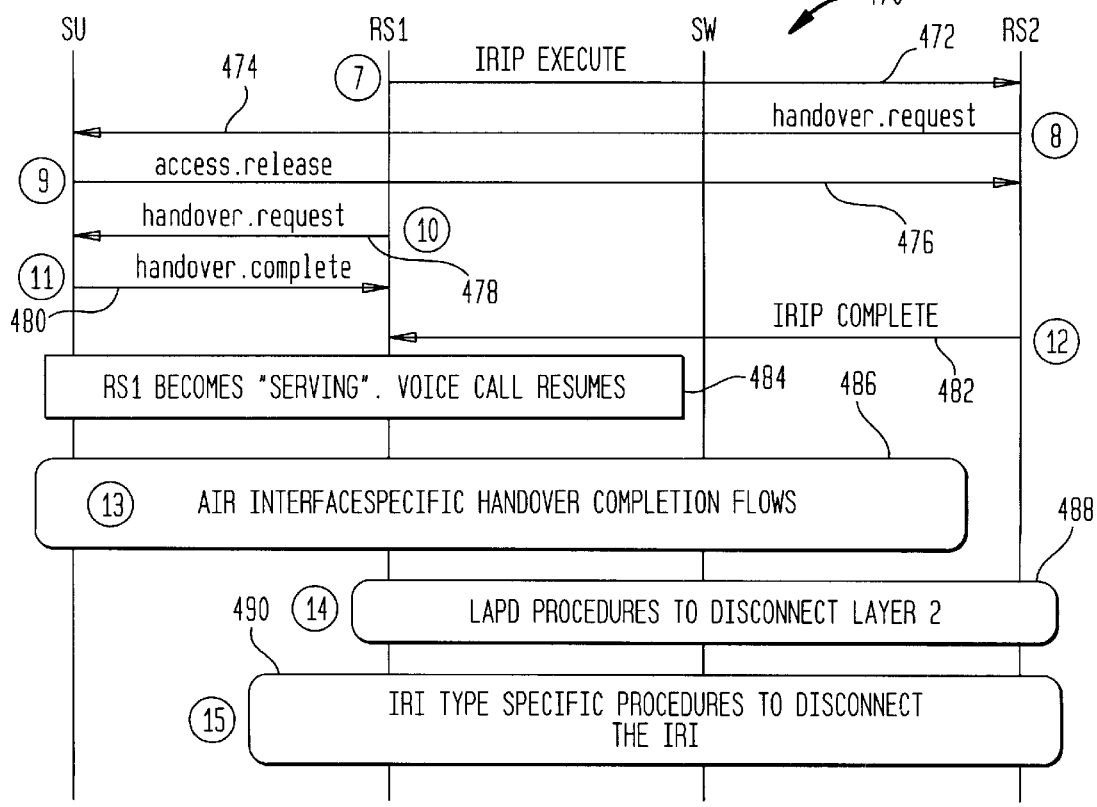
FIG. 24 illustrates an exemplary handover execution and completion call flow for a generic handover-back-to-anchor scenario.

FIG. 24 illustrates an exemplary handover execution and completion call flow 470 for a generic handover-back-to-anchor scenario. Once the previous air channel has been disconnected, the anchor RS may inform the serving RS (RS2) to start the handover execution process using an IRIP-L3 IRIP EXECUTE message (step 472). The serving RS (RS2) begins the handover execution process. Air interface specific, AIP-L2 message flows are exchanged between the SU and the serving RS (step 474). For example, the serving RS may send to the SU a handover.execute message. The SU may respond with an access.release message (step 476), indicating that the radio call resources for the call between the SU and RS2 are released. At the same time, the target RS may begin air interface specific AIP-L2 call flows (step 478). For example, the target RS may send a handover-.execute message to the SU. The SU may respond to the target RS with a handover.complete message (step 480).

When the handover execution is completed, the serving RS sends an IRIP-L3 message IRIP COMPLETE to the anchor RS (step 482). The target RS becomes the serving RS and the user information from the SU to the other party continues on RS1 without an IRI (step 484).

AIP-L3 call flows may occur to complete the handover (step 486). For example, anchor.rs.dn may be sent to the SU. No IRI is needed and the anchor RS starts the IRIP-L2 procedure to disconnect Layer 2 between itself and RS2 (step 488). The anchor RS begins the IRI disconnection procedure according to whether the transmission path was nailed-up or on-demand (see Section VII, B1)(step 490).

VIII. PACS Call Flows

In order to illustrate the present invention as it may be used with a known air interface protocol, this section will describe the call flows for the handover-forward, handover-to-third, and handover-back-to-anchor scenarios using a PACS air interface protocol.

A. PACS Messages and Parameters

The generic air interface protocol message names are associated with the following PACS air interface protocol messages:

| Generic Message Name | PACS Message Name |
| --- | --- |
| handover.request | ALT_REQUEST |
| handover.request.ack | ALT_ACK |
| suspend.talk.path | LINK_SUSPEND |
| resume.talk.path | LINK_RESUME |
| handover.execute | ALT_EXEC |
| access.release | ACCESS_RELEASE |
| handover.complete | ALT_COMP |
| anchor.dn.update | ALT_DN_UPDATE |
| anchor.dn.update.ack | ALT_DN_UPDATE ACK |

The following IRIP-L3 parameters are mapped with the following PACS parameters:

| IRIP-L3 Parameters | PACS Parameters |
| --- | --- |
| system.specific.info | N/A |
| radio.call.id | RCID |
| anchor.rs.dn | ALT_DN |
| registration.area.id | Registration Area ID |
| bandwidth.req | Required Channel Rate |

B. Handover-Forward Call Flows

Figure 25:
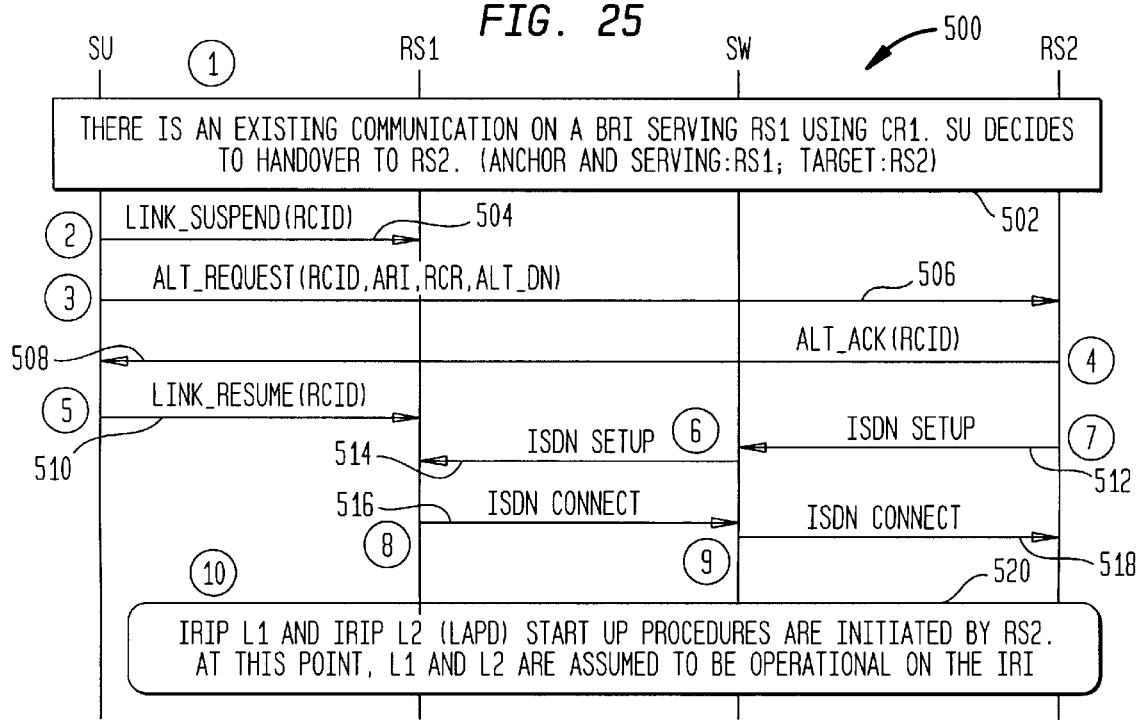
FIG. 25 illustrates an exemplary handover initiation call flow for a PACS handover-forward scenario.

In a handover-forward scenario, as illustrated in FIGS. 12A and 12B, several call flows should occur. FIG. 25 illustrates an exemplary handover initiation call flow 500 for a PACS handover-forward scenario.

An existing call between a SU and another party is to be handed over from the anchor/serving RS (RS1) to another RS (RS2). RS2 becomes the target RS (step 502). The SU sends a PACS Layer 2 LINK_SUSPEND message containing the radio.call.id (RCID) to the serving RS (RS1) (step 504). The SU also sends to the target RS a PACS Layer 2 message ALT_REQ containing the RCID required channel rate, and ALT_DN (step 506). When the target RS receives the ALT_REQ, it responds with an ALT_ACK containing the RCID (step 508).

When the SU receives the ALT_ACK message, it sends to the serving RS a PACS Layer 2 LINK_RESUME message (step 510). The target RS sends to the switch connected to the target RS an ISDN SETUP message with appropriate parameters, such as Called Party Number=anchor.rs.dn (step 512). The switch forwards the ISDN SETUP message to the anchor RS (step 514). The anchor RS responds with an ISDN CONNECT message which is sent to the switch (step 516) and forwarded to the target RS (step 518). Once the transmission path is established, the LAPD (e.g., MP-L2) link setup procedures occur (step 520).

Figure 26:
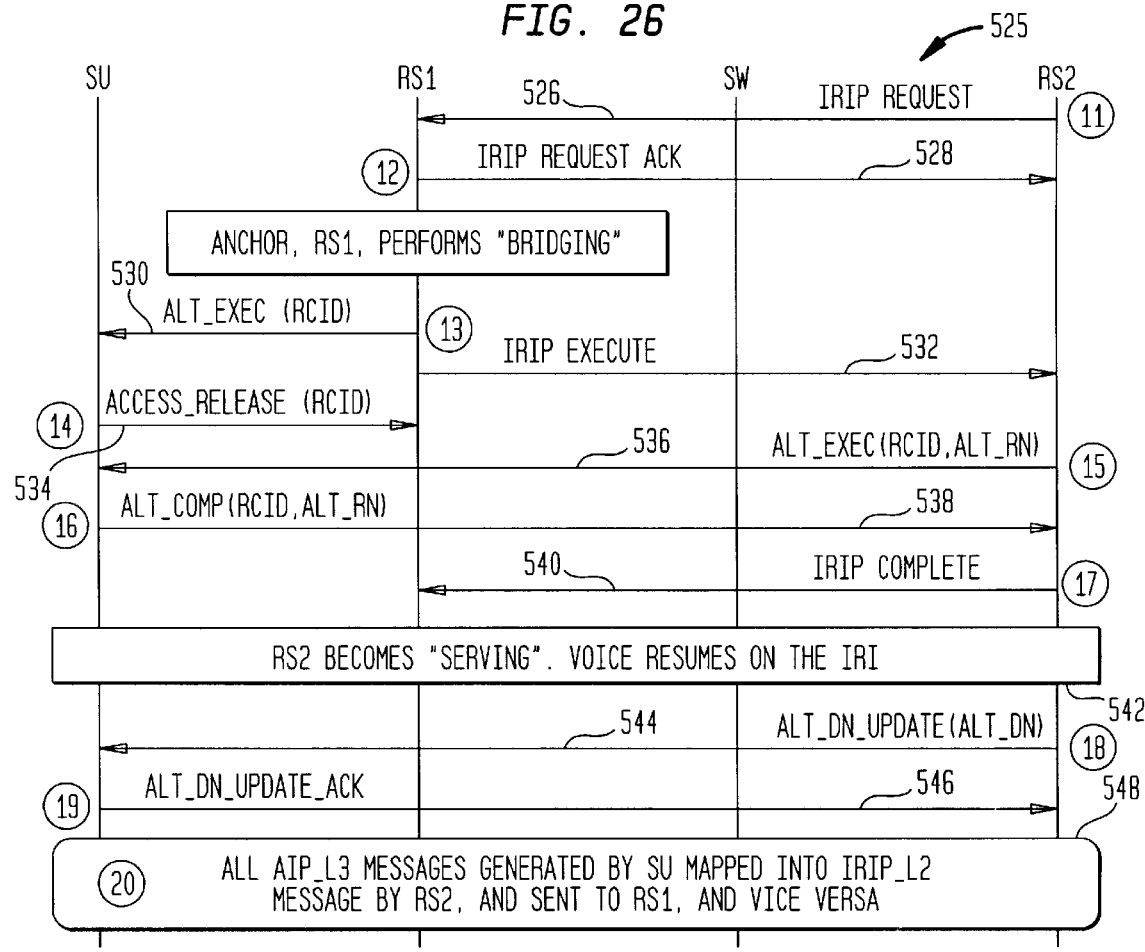
FIG. 26 illustrates an exemplary handover execution and completion call flow for a PACS handover-forward scenario.

FIG. 26 illustrates an exemplary handover execution and completion call flow 525 for a PACS handover-forward scenario. When the LAPD establishes a link, the target RS sends to the anchor RS an IRIP-L3 IRIP REQUEST (step 526), signaling the RCID and requesting the anchor RS to bridge the call to the transmission path just established. The anchor RS acknowledges the IRIP REQUEST signal (step 528) and begins the bridging process. The bridging is performed and the serving RS sends an ALT_EXEC message to the SU (step 530), indicating that the handover execution may begin. The anchor RS informs the target RS when the bridging is complete with an IRIP EXECUTE message (step 532). The SU responds to the ALT_EXEC message with an ACCESS_RELEASE message (step 534), indicating that the radio channel has been released. At the same time, the target RS sends to the SU an ALT_EXEC message (step 536), instructing the SU to switch over. The SU responds with an ALT_COMP message (step 538), indicating that it has switched over to the target RS.

When the target RS (now the serving RS) receives the ALT_COMP message, the handover is complete and sends to the anchor RS an IRIP COMPLETE message (step 540). The user information is now routed from the new serving RS to the anchor RS (step 542). The new serving RS (RS2) sends to the SU an ALT_DN_UPDATE message (step 544), indicating the DN of the anchor RS. The SU acknowledges this with an ALT_DN_UPDATE_ACK message (step 546). Once the handover completion calls are exchanged all AIP-L3 messages for the SU are placed in IRIP-L2 format by the anchor RS and sent to the new serving RS for processing (step 540). Similarly, all PACS-L3 messages from the SU are translated into IRIP-L2 messages by the serving RS and sent to the anchor RS for processing.

Figure 27:
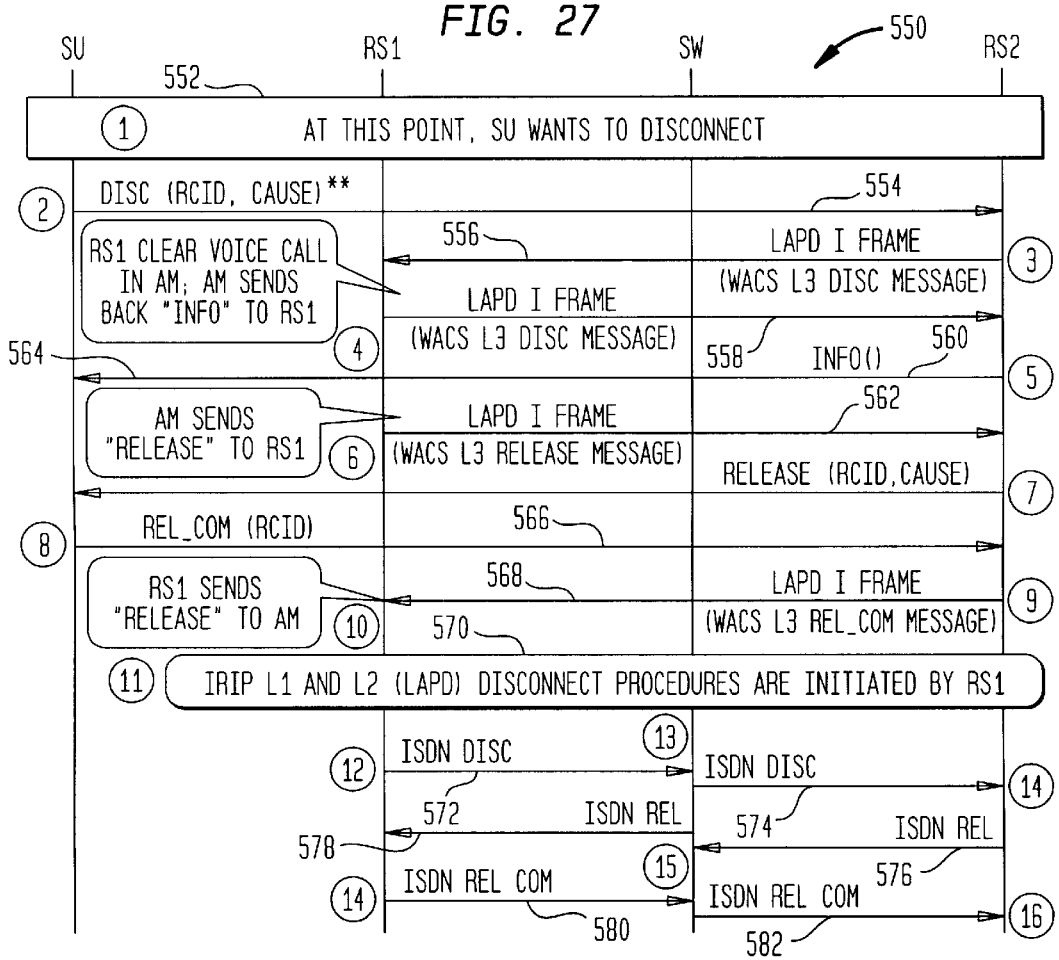
FIG. 27 illustrates an exemplary disconnection call flow for a PACS handover-forward scenario.

FIG. 27 illustrates an exemplary disconnection call flow 550 for a PACS handover-forward scenario. Assume that a SU desires to end a call (step 552). The SU may issue to the serving RS a DISC message (step 554). The serving RS packages the DISC message into an IRIP-L2 message and forwards it to the anchor RS (step 556).

When the anchor receives the IRIP-L2 disconnect message, it understands that the message is a PACS DISC message and delivers it to the PACS-L3 protocol. The anchor RS determines that the SU has requested disconnection. The anchor RS begins a disconnection process. The anchor RS clears the voice call in the network by executing the appropriate steps. The anchor may receive information from an access manager. The anchor RS formulates a PACS-L3 INFO message and sends the message via IRIP-L2 to the serving RS (step 558), which forwards the message to the SU (step 560). The anchor RS may release the message from the access manager by sending to the serving RS a RELEASE message (step 562), which forwards the message to the SU (step 564). The SU completes the release by issuing to the serving RS a REL_COM message (step 566). The serving RS sends to the anchor RS the REL_COM message with an IRIP-L2 message (step 568). The anchor RS may send the message to the access manager to free the network resources.

There is no longer a need for an IRI. The anchor RS starts disconnecting the Layer 2 (step 570). The anchor RS sends to the switch an ISDN DISC message (step 572), which is forwarded to the old serving RS (step 574). The old serving RS sends to the switch an ISDN REL message (step 576), which is forwarded to the anchor RS (step 578). The anchor sends to the switch an ISDN REL COM message (step 580), which is forwarded to the old serving RS (step 582). When RS2 receives the ISDN REL COM message, it releases the resources allocated for the IRI. No path exists between RS1 and RS2. The HLR 110, VLR 124, access manager 109, or other network peripheral may need to be updated to include information about the current location and status of the SU 126.

C. Handover-to-Third Call Flows

Figure 28:
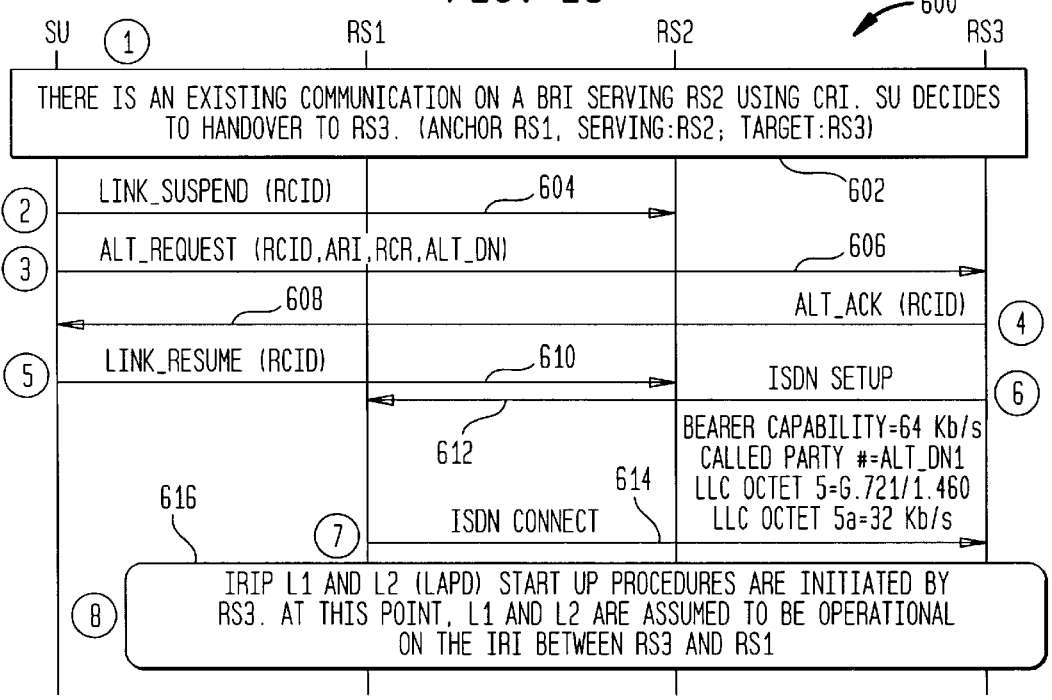
FIG. 28 illustrates an exemplary handover initiation call flow for a PACS handover-to-third scenario.

In a handover-to-third scenario, as illustrated in FIGS. 13A and 13B, several call flows should occur. FIG. 28 illustrates an exemplary handover initiation call flow 600 for a PACS handover-to-third scenario. Assume that a call is in progress, and a first RS (RS1) is the anchor RS. The SU is currently being served by a second RS (RS2), and decision is made to handover the call to a third RS (RS3)(step 602). RS3, therefore, is the target RS.

The PACS system specific handover initiation procedure occurs. The SU sends to the serving RS a PACS Layer 2 LINK_SUSPEND message (step 604). The SU also sends to the target RS a PACS Layer 2 ALT_REQUEST message (step 606). The target RS acknowledges the ALT_REQ by sending an ALT_ACK message to the SU (step 608) and begins to establish the digital transmission path.

When the SU receives the ALT_ACK message, it sends to the serving RS a PACS Layer 2 LINK_RESUME message (step 610). The target RS sends to the switch an ISDN SETUP message to the switch, which message is forwarded to the anchor RS (step 612). The anchor RS sends to the switch an ISDN CONNECT message, which is forwarded to the target RS (step 614). Once the transmission path is established, the LAPD link setup procedures occur (step 616).

Figure 29:
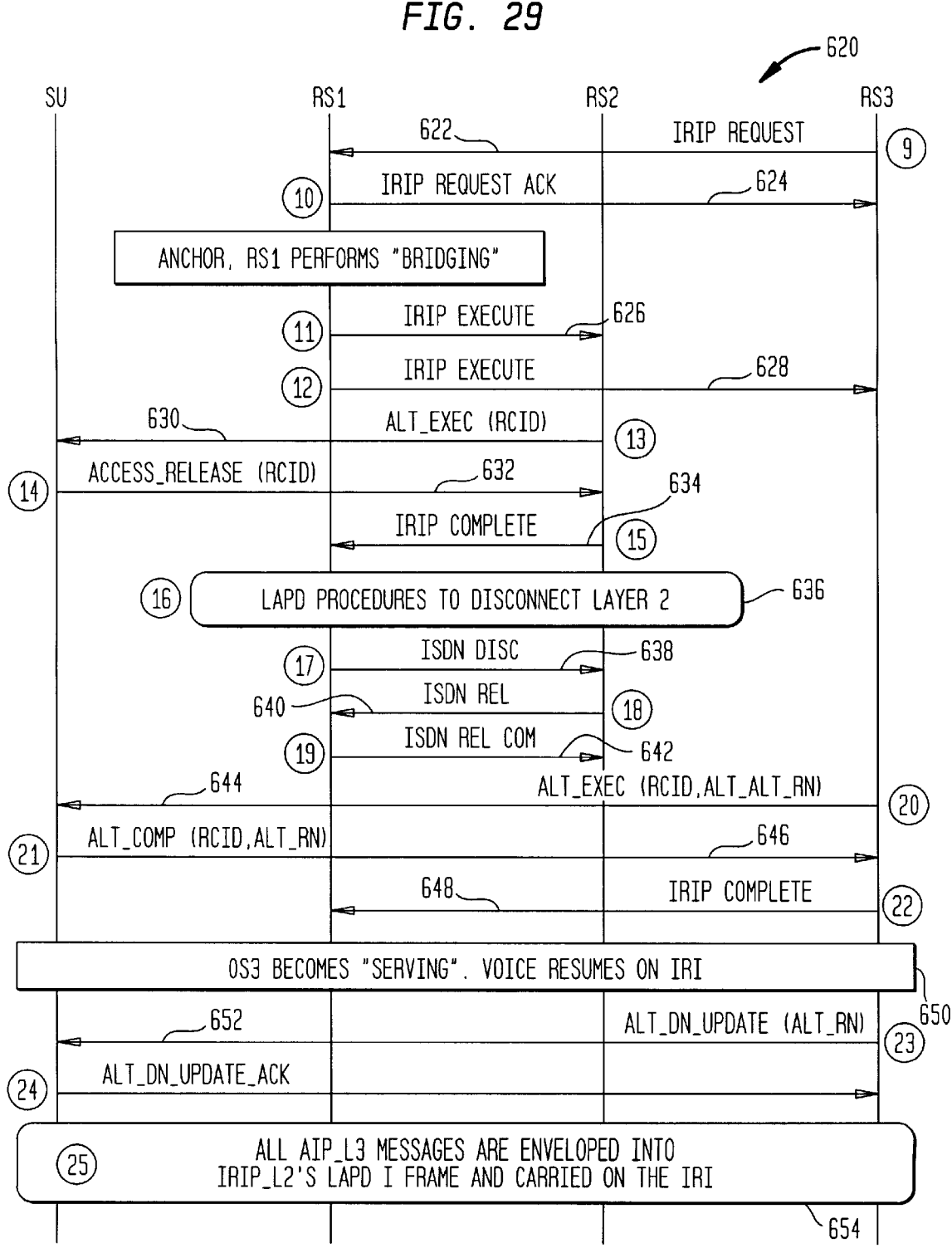
FIG. 29 illustrates an exemplary handover execution completion call flow for a PACS handover-to-third scenario.

FIG. 29 illustrates an exemplary handover execution and completion call flow 620 for a PACS handover-to-third scenario. When the LAPD establishes a link, the target RS sends to the anchor RS an IRIP-L3 IRIP REQUEST (step 622), signaling the RCID and requesting the anchor RS to bridge the call to the transmission path just established. The anchor RS acknowledges the message by issuing an IRIP REQUEST ACK signal (step 624) and begins the bridging process. The anchor RS informs the serving RS that the bridging is complete by issuing an IRIP EXECUTE message (step 626). The serving RS may begin the handover execution process. At the same time, the anchor RS also sends to the target RS an IRIP EXECUTE message (step 628). The target RS may begin the handover execution process.

At this time, the serving RS sends to the SU a PACS Layer 2 ALT_EXEC message (step 630), indicating that the channel between the SU and RS2 may be released. The SU may respond with an ACCESS_RELEASE command (step 632), indicating that the radio channel resources for the call between RS2 and the SU are released. When the serving RS releases the channel resources, it sends to the anchor RS an IRIP-L3 IRIP COMPLETE message (step 634). The anchor RS begins to disconnect the signal transmission path between it and the old serving RS (RS2). RIP-L2 procedures disconnecting layer 2 from old serving RS to the anchor RS are started (step 636). The anchor RS sends to the switch an IRIP-L3 ISDN DISC message, which is forwarded to the old serving RS (RS2) (step 638). The old RS responds by sending to the anchor RS an IRIP-L3 ISDN REL message (step 640). The anchor RS sends an ISDN REL COM message to the old serving RS (step 642).

At the time the target RS (RS3) receives the IRIP EXECUTE message (step 628), it sends to the SU a PACS Layer 2 ALT_EXEC message (step 644). The SU responds with an PACS Layer 2 ALT_COMP message (step 646), indicating completion of the switch to the target RS. When the target RS receives the ALT_COMP message, the target RS sends to the anchor RS an IRIP-L3 message IRIP COMPLETE (step 648). The target RS (RS3) is now the serving RS and the user information is routed from the SU to RS3 to RS1 to the telephone network (step 650).

To complete the handover, the new serving RS (RS3) sends to the SU an ALT_DN_UPDATE (step 652), indicating the DN of the anchor RS. The SU responds with an ALT_DN_UPDATE_ACK message (step 652). Once the handover completion calls are exchanged all PACS-L3 messages from the SU are placed in IRIP-L2 format by the serving RS and sent to the anchor RS for processing (step 654). Similarly, all PACS-L3 messages generated by the anchor RS are translated into IRIP-L3 by the anchor and sent to the SU for processing.

The disconnection call flows are the same as in the handover-forward scenario discussed above in relation to FIG. 27.

D. Handover-Back-To-Anchor Scenario

Figure 30:
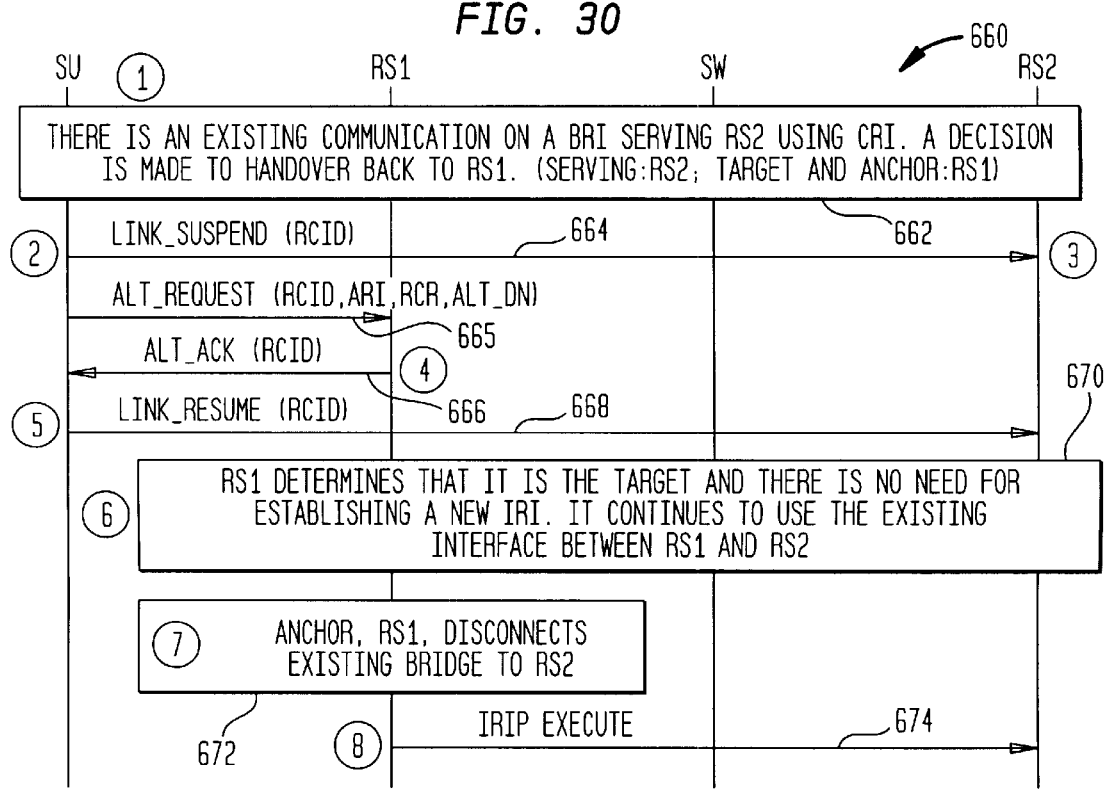
FIG. 30 illustrates an exemplary handover initiation call flow for a PACS handover-back-to-anchor scenario.

In a handover-back-to-anchor scenario, as illustrated in FIGS. 15A and 15B, several call flows should occur. FIG. 30 illustrates an exemplary handover initiation call flow for a PACS handover-back-to-anchor scenario. Assume that a call is in progress, and a first RS (RS1) is the anchor RS. The SU is currently being served by a second RS (RS2), and a decision is made to handover the call back to the first RS (RS1)(step 662). RS1, therefore, is both the serving RS and the target RS.

The SU issues to the serving RS a PACS Layer 2 LINK_SUSPEND message (step 664). The SU also sends to the target RS a PACS Layer 2 ALT_REQ message (step 665). The target RS acknowledges the message with an ALT_ACK message (step 666). The SU sends to the serving RS a PACS Layer 2 LINK_RESUME message (step 668).

RS1 determines that it is the target RS and no IRI is needed. The existing interface between RS1 and RS2 is used for exchanging signals (step 670). The anchor RS begins the bridging process by bridging the new air channel to the call and disconnecting the old handover air channel from the call (step 672). Once the previous air channel has been disconnected, the anchor RS may inform the serving RS (RS2) to start the handover execution process using an IRIP-L3 IRIP EXECUTE message (step 674).

Figure 31:
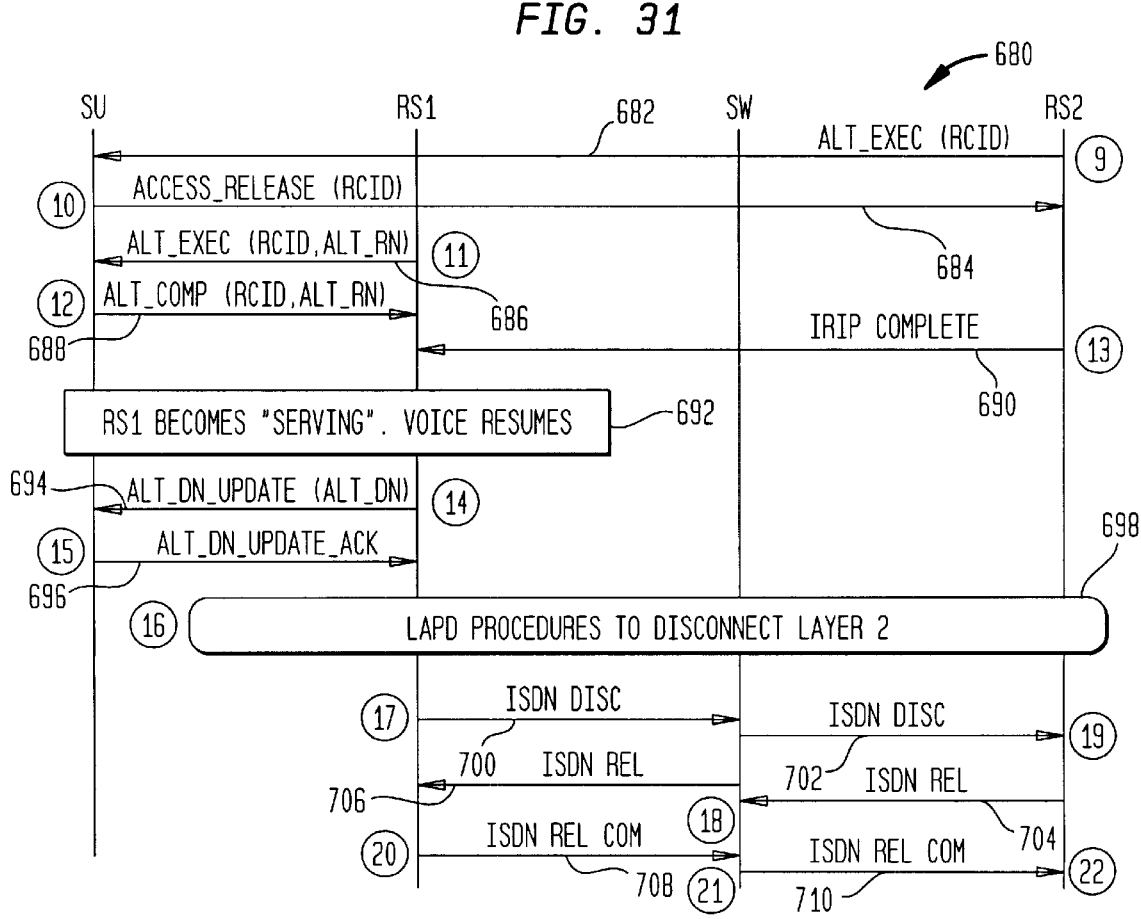
FIG. 31 illustrates a handover execution and completion call flow for a PACS handover-back-to-anchor scenario.

FIG. 31 illustrates a handover execution and completion call flow 680 for a PACS handover-back-to-anchor scenario. The serving RS (RS2) begins the handover execution process. The serving RS sends to the SU a PACS Layer 2 ALT_EXEC message (step 682), indicating that the channel between RS2 and the SU may be released. The SU responds with a PACS Layer 2 ACCESS_RELEASE message (step 684), indicating that the resources for the call between the SU and RS2 are released. At the same time, the target RS sends to the SU an ALT_EXEC message (step 686) instructing the SU to switch over to RS1. The SU responds to the target RS with a PACS Layer 2 ALT_COMP message (step 688).

When the handover execution is completed, the serving RS sends an IRIP-L3 message IRIP COMPLETE to the anchor RS (step 690). The target RS becomes the serving RS and the user information from the SU to the other party continues on RS1 without an IRI (step 692).

The anchor RS starts disconnecting the Layer 2 (step 698). The anchor RS sends to the switch an ISDN DISC message (step 700), which is forwarded to the old serving RS (step 702). The old serving RS sends an ISDN REL message to the switch (step 704), which is forwarded to the anchor RS (step 706). The anchor RS sends an ISDN REL COM message to the switch (step 708), which is forwarded to the old serving RS (step 710). When RS2 receives the ISDN REL COM message, it releases the resources allocated for the IRI. No path exists between RSI and RS2. The HLR 110, VLR 124, access manager 109, or other network peripheral may need to be updated to include information about the current location and status of the SU 126.

IX. CONCLUSION

A method for handing over a wireless communication between radio systems is described. Throughout a call, an anchor RS remains the interface between the wireless communication network and the telephone network, even if the wireless communication changes radio systems. This allows (1) the signaling to set up the connections between the anchor and target RPCUs; and (2) the maintenance information for the call to remain in the anchor RPCU, which is connected to the original switch. This avoids tying up network switches with exchanging signals and call maintenance information about service features, thus resulting in a substantial "savings" in valuable telephone network resources. This also eliminates any need to modify the existing switches to implement the handovers.

A person skilled in the art understands that the invention may be used with any wireless communication system. For example, although a PACS system was disclosed, it is understood that other air interface protocols, cellular, or other wireless communication system may also be used. The above described embodiments of the invention are intended to be illustrative only. Numerous alternative embodiments may be devised by those skilled in the art without departing from the spirit and scope of the following claims.

APPENDIX A

Glossary of Acronyms

| | |
|---|---|
| AIP | Generic Air Interface Protocol |
| AM | Access Manager |
| BRI | Basic Rate Interface |
| BS | Base Stations |
| CA | Coverage Area |
| CIP | Generic C Interface Protocol |
| DN | Directory Number |
| DS0 | Digital Signal 0 |
| HLR | Home Location Register |
| HM-A | Handover Manager-Anchor |
| HM-S | Handover Manager-Serving |
| IRI | Inter-Radio System Interface |
| IRIP | Inter-Radio System Interface Protocol |
| ISP | Intelligent Services Peripheral |
| ISDN | Integrated Signaling Digital Network |
| LAPB | Link Access Procedures For B Channel |
| LAPD | Link Access Procedures For D Channel |
| LAPF | Link Access Procedures For F Channel |
| ME-A | Mapping Entity-Anchor |
| ME-S | Mapping Entity-Serving |
| MFEM | Multiple-Frame-Extended-Mode |
| NI-1 | National ISDN 1 |
| PACS | Personal Access Communications System |
| PRI | Primary Rate Interface |
| PSTN | Public Switched Telephone Network |
| RP | Radio Port |
| RPCU | Radio Port Control Unit |
| RS | Radio System (RP/RPCU) |
| SCP | Service Control Point |
| SSP | Service Switching Point |
| STP | Switching Transfer Point |
| SU | Subscriber Unit or Mobile Terminal |
| VLR | Visiting Location Register |

APPENDIX B

| AIR INTERFACE FUNCTIONS | SERVING RS | ANCHOR RS |
|---|---|---|
| Link performance measurements (e.g., Word Error Indicator) | * | |
| Link performance management (e.g., power control) | * | |
| Error control and flow control of AIP L3 messages by AIP L2 | * | |
| Encipherment, Privacy | * | |
| Multiplexing and management of associated signaling channels | * | |
| Echo treatment | | * |
| Air Interface framing, multiplexing | * | |
| Transcoding from subrate to 64 Kb/s PCM | | * |
| Equalization (as required) | * | |
| Micro diversity (as required) | * | |
| Error detection (CRC)/correction (as required) | * | |
| Burst and frame Synchronization on the air interface | * | |
| AIP L3 State Machine for existing calls | | * |
| AIP L3 "Info" messages wiih"dialed digits" (Keypad to DTFM conversion) | | * |

APPENDIX C

| TRANSMISSION PATH | SPECIFICATION/GUIDELINES |
|---|---|
| BRI- B Channel | ITU-T Recommendation I.430, Basic User-Network Interface Layer 1 Specification. SR-NWT-00266, National ISDN Generic Guidelines for ISDN Terminal Equipment on Basic Rate Interfaces, Issue 1 |

APPENDIX C-continued

| TRANS-MISSION PATH | SPECIFICATION/GUIDELINES |
|---|---|
| | § 3 (Bellcore, June 1993, revision 1, August 1993). GR-2814-CORE, Generic Criteria for PCS Integrated Access Systems, Issue 1 (Bellcore, June 1994). (Only if multiplexing required). |
| PRI-B Channel | ITU-T recommendation I.431, Primary User-Network Interface-Layer 1 Specification. SR-NWT-002343, ISDN Primary Rate Interface Generic Guidelines for Customer Premises Equipment, Issue 1, § 3 (Bellcore, June 1993). |
| DSØ CCC in a DSX-1 | TR-NWT-000499, Transport Systems Generic Requirements (TSGR): Common Requirement, Issue 5 (Bellcore, December 1993). |

APPENDIX D

| CHANNEL | SPECIFICATION/GUIDELINES |
|---|---|
| 64 Kb/s | ITU-T Recommendation I.460, Multiplexing, Rate Adaptation and Support of Existing Interfaces, ITU-T Blue Book, 1988. |
| DSØ | ITU-T Recommendation I.460, Multiplexing, Rate Adaptation and Support of Existing Interfaces, ITU-T Blue Book, 1988. |
| 56 Kb/s | ITU-T Recommendation V.110, Support of Data Terminal Equipment with V-Series Type Interfaces by an Integrated Services Digital Network. |

Coding fields for substrate multiplexing may be done according to the following figure:

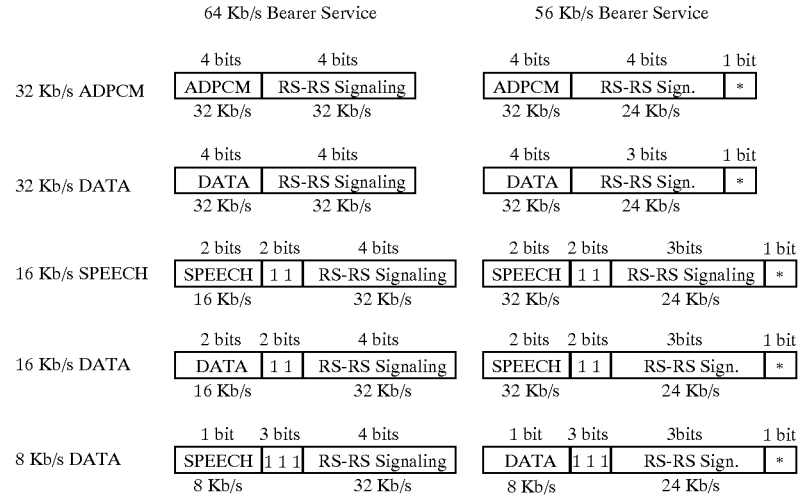

*V.110 Rate Adaption to 64 Kb/s (bit stuff a "1")

APPENDIX E

D Channel Link Access Procedures are described in:
1. ITU-T Recommendation Q.920, *ISDN User-Network Interface Data Link Layer-General Aspects*, ITU-T, Blue Book (1988).
2. ITU-T Recommendation Q.921, *ISDN User-Network Interface Data Link Layer-Specification*, ITU-T, Blue Book (1988).
3. TR-TSY-000793, *ISDN D-Channel Exchange Access Signaling and Switching Requirements* (*Layer* 2), Issue 1 (Bellcore, October 1988).
4. SR-TSY-002343, *ISDN Primary Rate Interface Generic Guidelines for Customer Premises Equipment*, Issue 1 (Bellcore, June 1993).

APPENDIX F

Preferred IRIP-L2 Values are:
1. The anchor RS sends commands with the C/R bit set to zero and responses with the C/R bit set to one. The target/serving RS does the opposite of the anchor RS.
2. The maximum number of outstanding unacknowledged information frames, k, should be RS selectable with a default value of seven.
3. The maximum number of permitted re-transmissions of frames should be RS selectable with a default value of three.
4. The maximum number of octets in the information field of an I frame is 256.
5. A timer (T-2500) which specifies the waiting period for a receipt of an acknowledgement of a transmitted frame is RS selectable within the range 100 ms, 2350 ms. The default value shall be 100 ms.
6. A timer (T-203) which is used to time periods of inactivity on a data length, is RS selectable within the range of 10 to 300 seconds. The default value shall be 20 seconds.
7. During idle conditions, contiguous LAPD framing flag as the idle code are transmitted across the interface.
8. The following SAPI/TEI combinations always have the fixed assignment as shown below:
   a. SAPI=0, TEI=0 shall be used to process IRIP-L3 messages.
   b. SAPI=16, TEI=0 shall be used to process AIP-L3 messages.

APPENDIX G

Assume that all RSs use common method to identify/number channels and that the RSs are connected by a number of DS0 channels.

1. Each RS keeps a table indicating the status of each DS0 channel. The status indicates whether the channel is busy, idle, or out-of-service.
2. The target RS shall be responsible for selecting a DS0 for a new handover request. To minimize "glaring", a target RS randomly selects an available (e.g., idle) DS0 channel by using a random number generator algorithm.
3. Once a DS0 channel is selected, the target RS starts the LAPD procedures to bring up the link layer. Once layer two is established, both the target RS and anchor RS mark this DS0 channel as busy.
4. When the handover between two RSs is no longer needed, the anchor RS starts the LAPD disconnect procedures to bring down the link layer. Once layer two is disconnected, both the target RS and anchor RS mark this DS0 channel as idle.

We claim:

1. A method for handing over a wireless communication from a current serving radio system to a target radio system, wherein the current serving radio system is directly connected to an anchor radio system which connects the wireless communication to a wireline telephone network, the method comprising the steps of:
   a. determining that the wireless communication is to be handed over from the current serving radio system to the target radio system;
   b. establishing an inter-radio system interface between the anchor radio system and the target radio system;
   c. handing over the wireless communication from the current serving radio system to the target radio system in a manner so that the anchor radio system remains connected to the wireline telephone network and the target radio system is bridged with the anchor radio system with no intervening radio systems.

2. The method of claim 1, wherein a wireless subscriber unit and the current serving radio system perform an air interface protocol and the anchor radio system and the switched telephone network perform a radio system/switch interface protocol, the method further comprises the steps of:
   a. establishing the inter-radio interface between the air interface and the radio system/switch interface;
   b. the inter-radio interface performing an inter-radio interface protocol which directly connects the anchor radio system to the target radio system without any intervening radio systems.

3. The method of claim 1, further comprising the step of the anchor radio system establishing the inter-radio system interface.

4. The method of claim 1, further comprising the step of the handoff establishing a connection between the anchor radio system and the target radio system through the wireline telephone network with no intermediate switches between the anchor radio system and the target radio system.

5. The method of claim 1, wherein the step of establishing the inter-radio system interface further includes the step of transferring signals between the anchor radio system and the target radio system.

6. The method of claim 2, wherein the step of performing the inter-radio system interface protocol further comprises the steps of:
   a. coordinating air interface protocol messages with the radio system/switch protocol;
   b. providing a relay for coordinating transport of air interface protocol messages to the serving radio system;
   c. providing a set of functions in the anchor radio system supporting the operation of the handover; and
   d. providing a set of functions in the target and serving radio systems supporting the operation of the handover.

7. The method of claim 6, wherein the step of coordinating further comprises the steps of:
   a. receiving information from the air interface protocol;
   b. formulating messages for the wireline telephone network;
   c. receiving information from the radio system/switch protocol; and
   d. formulating responses to the subscriber unit.

8. The method of claim 1, wherein after the step of handing over, the method further comprises the step of eliminating the current serving radio system from a communication path established for the communication from the anchor radio system to the target radio system.

* * * * *

UNITED STATES PATENT AND TRADEMARK OFFICE
CERTIFICATE OF CORRECTION

PATENT NO. : 6,009,326

DATED : December 28, 1999

INVENTOR(S) : Paul W. Roder and Mehmet Ulema

It is certified that error appears in the above-identified patent and that said Letters Patent are hereby corrected as shown below:

Cover Page, [73] Assignee, change "Telecordia" to --Telcordia--

Signed and Sealed this

First Day of May, 2001

Attest:

NICHOLAS P. GODICI

Attesting Officer    Acting Director of the United States Patent and Trademark Office